United States Patent [19]
White et al.

[11] Patent Number: 5,239,575
[45] Date of Patent: Aug. 24, 1993

[54] TELEPHONE DIAL-INBOUND DATA ACQUISITION SYSTEM WITH DEMAND READING CAPABILITY

[75] Inventors: Darryl C. White, Norcross; Steven M. Ward, Alpharetta, both of Ga.

[73] Assignee: Schlumberger Industries, Inc., Atlanta, Ga.

[21] Appl. No.: 727,171

[22] Filed: Jul. 9, 1991

[51] Int. Cl.$^5$ ............................................. H04M 11/00
[52] U.S. Cl. ................................. 379/107; 340/870.02
[58] Field of Search ............... 379/106, 107, 93, 96–98, 379/377–382, 385, 92; 340/870.01, 870.02, 870.03

[56] References Cited

U.S. PATENT DOCUMENTS

| | | |
|---|---|---|
| 4,056,684 | 11/1977 | Lindstrom . |
| 4,241,237 | 12/1980 | Paraskevakos et al. . |
| 4,345,113 | 8/1987 | Shelley . |
| 4,392,023 | 7/1983 | Sears ................................. 379/377 |
| 4,455,453 | 6/1984 | Parasekvakos et al. . |
| 4,469,917 | 9/1984 | Shelley . |
| 4,504,831 | 3/1985 | Jahr et al. . |
| 4,578,534 | 3/1986 | Shelley . |
| 4,584,602 | 4/1986 | Nakagawa ........................ 379/92 |
| 4,614,945 | 9/1986 | Brunius et al. . |
| 4,707,852 | 11/1987 | Jahr et al. . |
| 4,742,536 | 5/1988 | Dewenter et al. .................. 379/377 |
| 4,802,207 | 1/1989 | Uchida ............................. 379/377 |
| 4,847,892 | 7/1989 | Shelley . |
| 4,852,152 | 7/1989 | Honick . |
| 4,958,371 | 9/1990 | Damoci et al. ..................... 379/107 |
| 5,012,510 | 4/1991 | Schaubs et al. .................... 379/106 |
| 5,025,470 | 6/1991 | Thornborough et al. .......... 379/107 |

Primary Examiner—Wing F. Chan
Attorney, Agent, or Firm—Dale V. Gaudier

[57] ABSTRACT

A telephone dial-inbound data acquisition system with demand reading capability. The system has particular application for remotely reading utility meters. A remote data unit (RDU) dials up a host computer on a periodic basis. The RDU is assigned a callback start time by the host computer. The RDU calculates an actual callback time based on the callback start time and a randomly generated time delay. The RDU dials up the host computer via a modem when the local time, as shown by an on-board real-time clock at the RDU, equals the calculated actual callback time. Meter reading data is then transferred to the host computer. The RDU also contains circuitry for detecting a polling signal generated by the host computer. Upon detection of this polling signal, the RDU immediately dials back the host computer and transfers utility meter reading data to the host computer. The RDU will also immediately dial back the host computer if an alarm condition occurs, e.g. tampering or a low battery condition. The RDU contains circuitry for characterizing the on-hook and off-hook electrical characteristics of the telephone line to ensure that the RDU does not interfere with normal operation of a customer's telephone line.

29 Claims, 12 Drawing Sheets

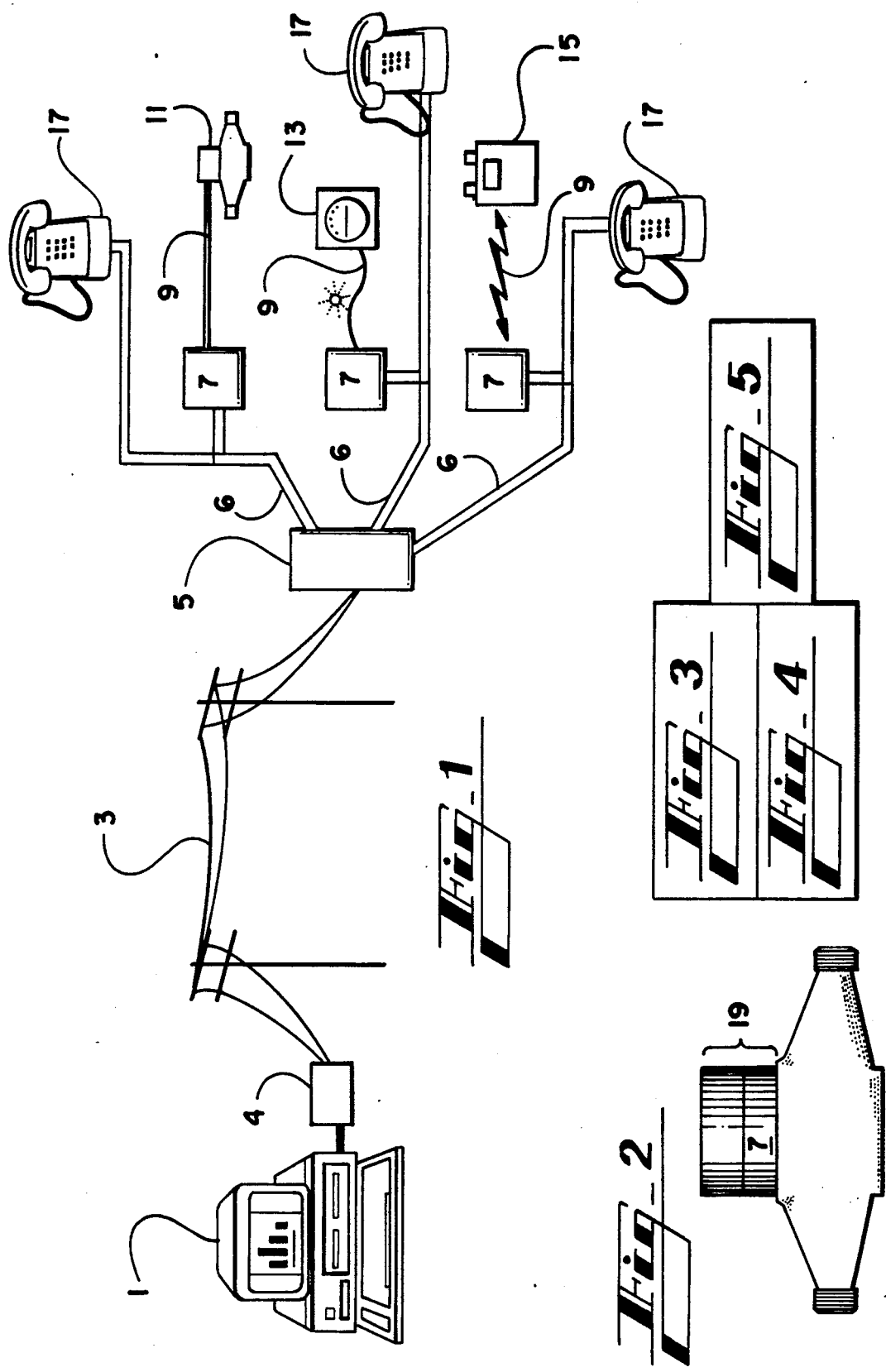

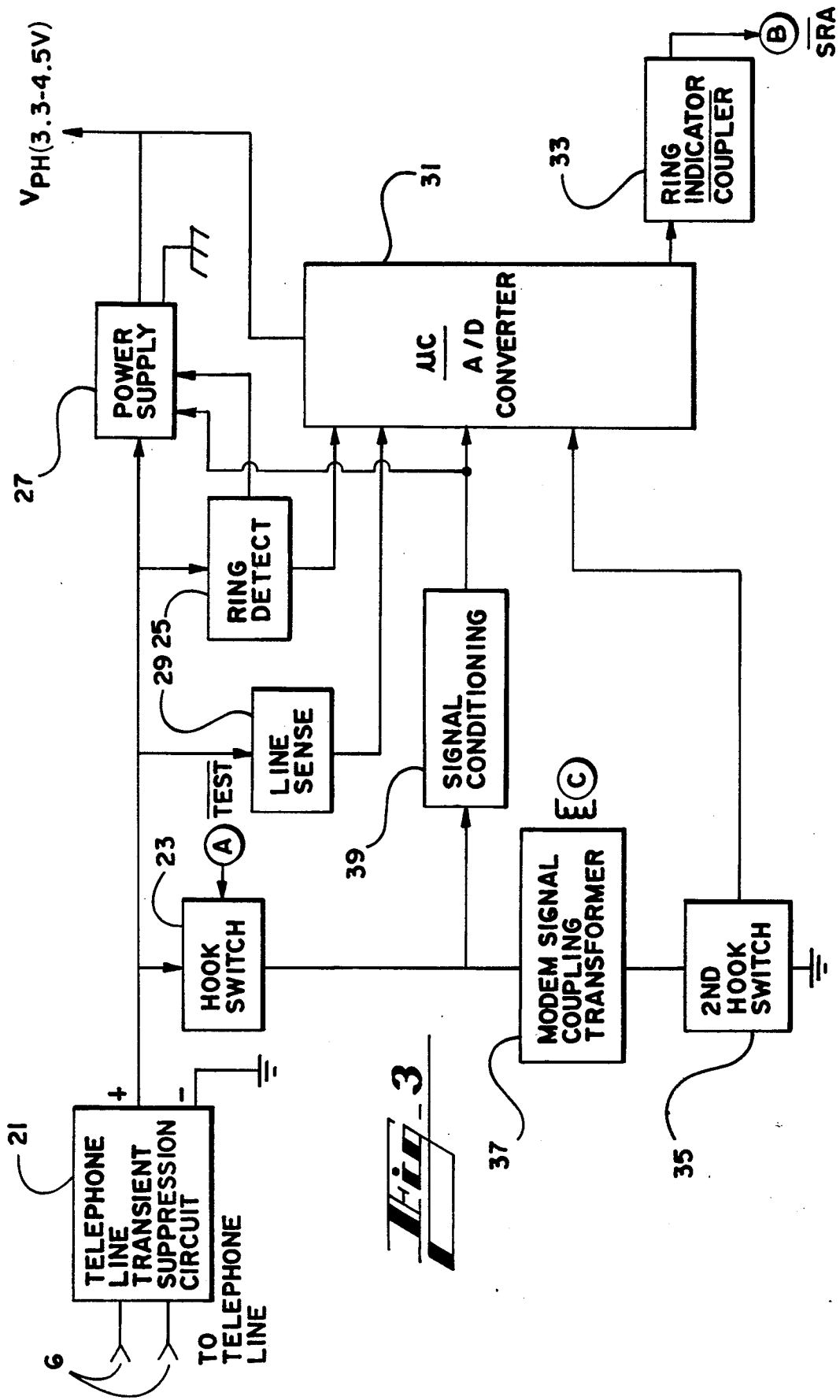

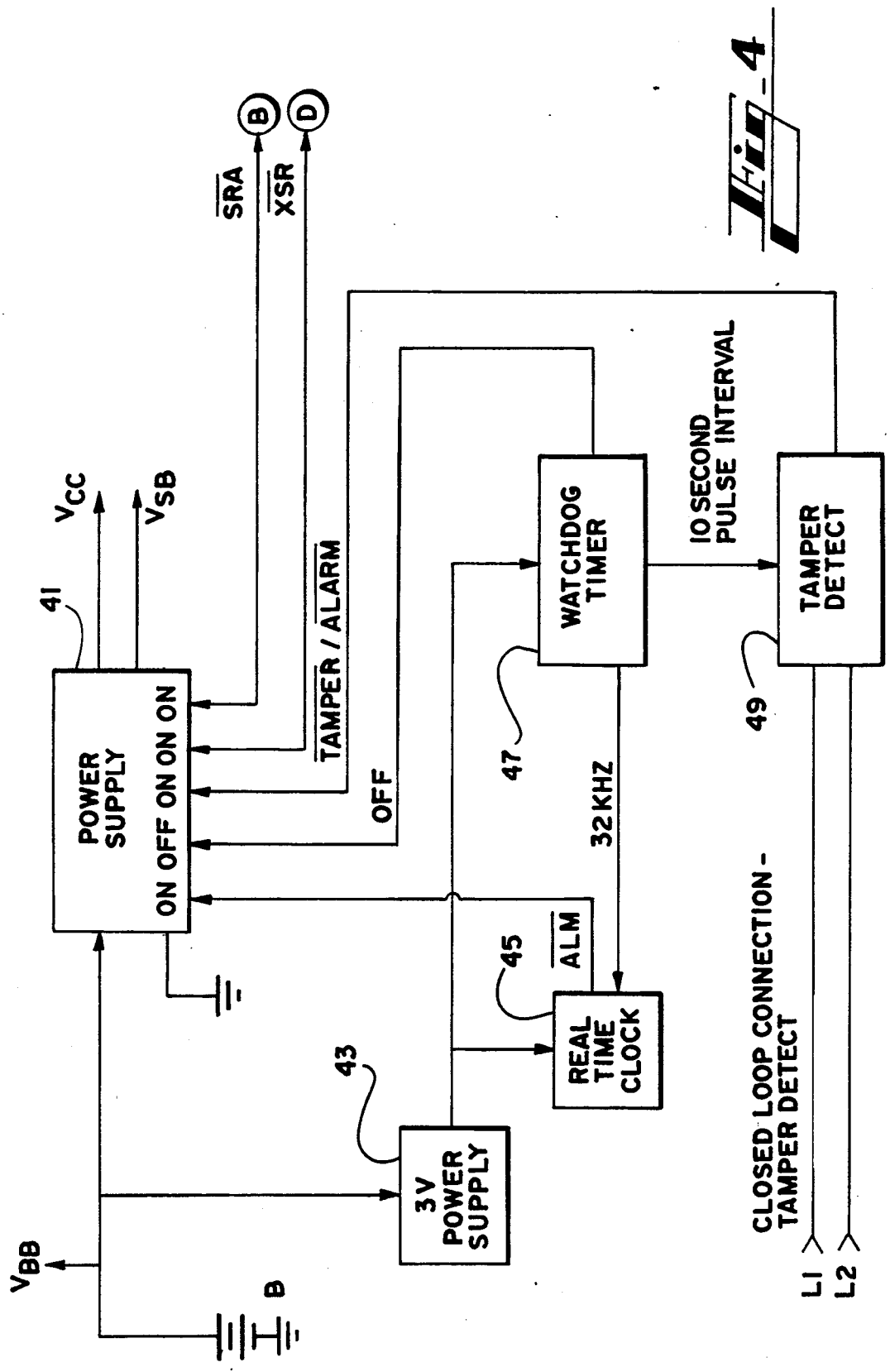

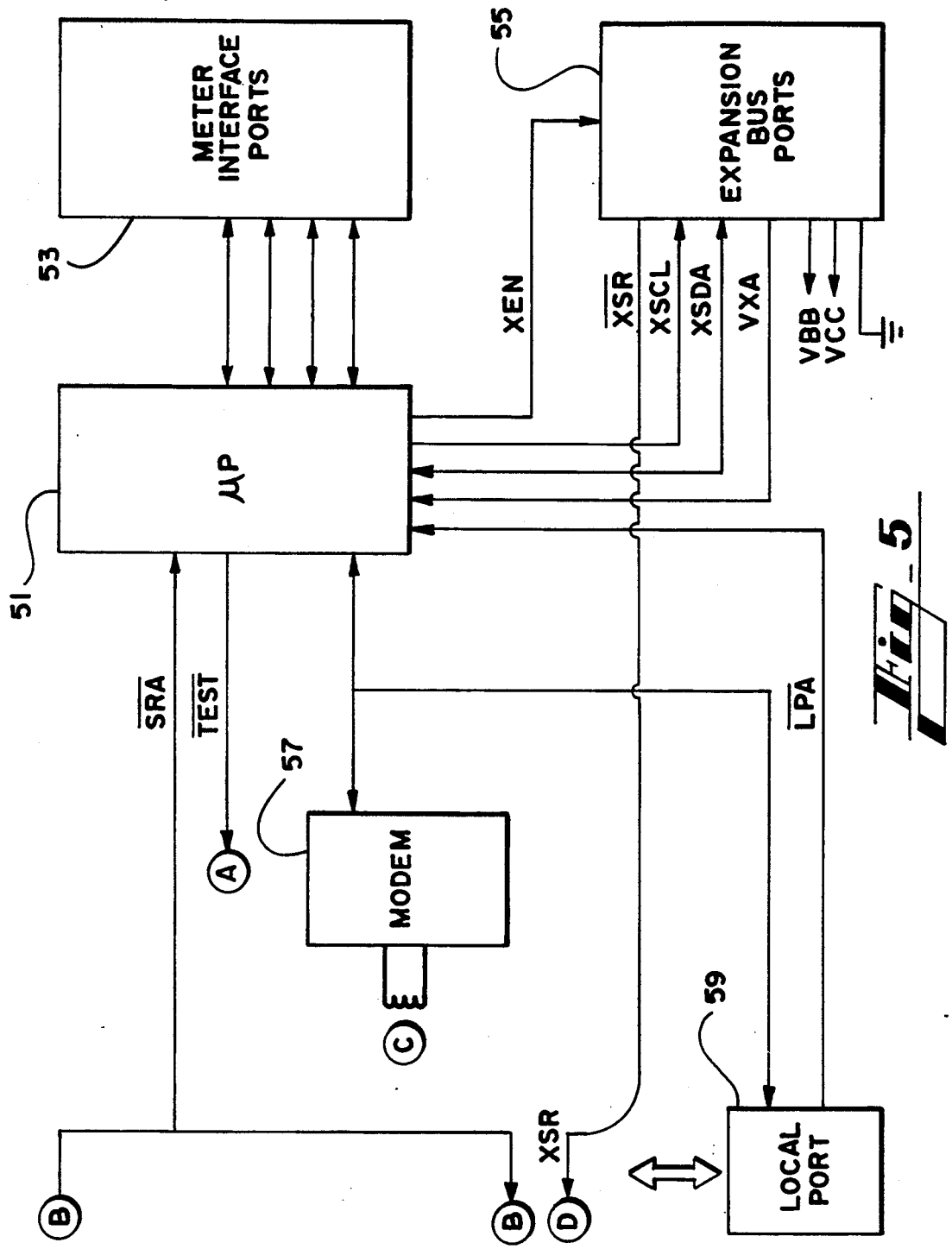

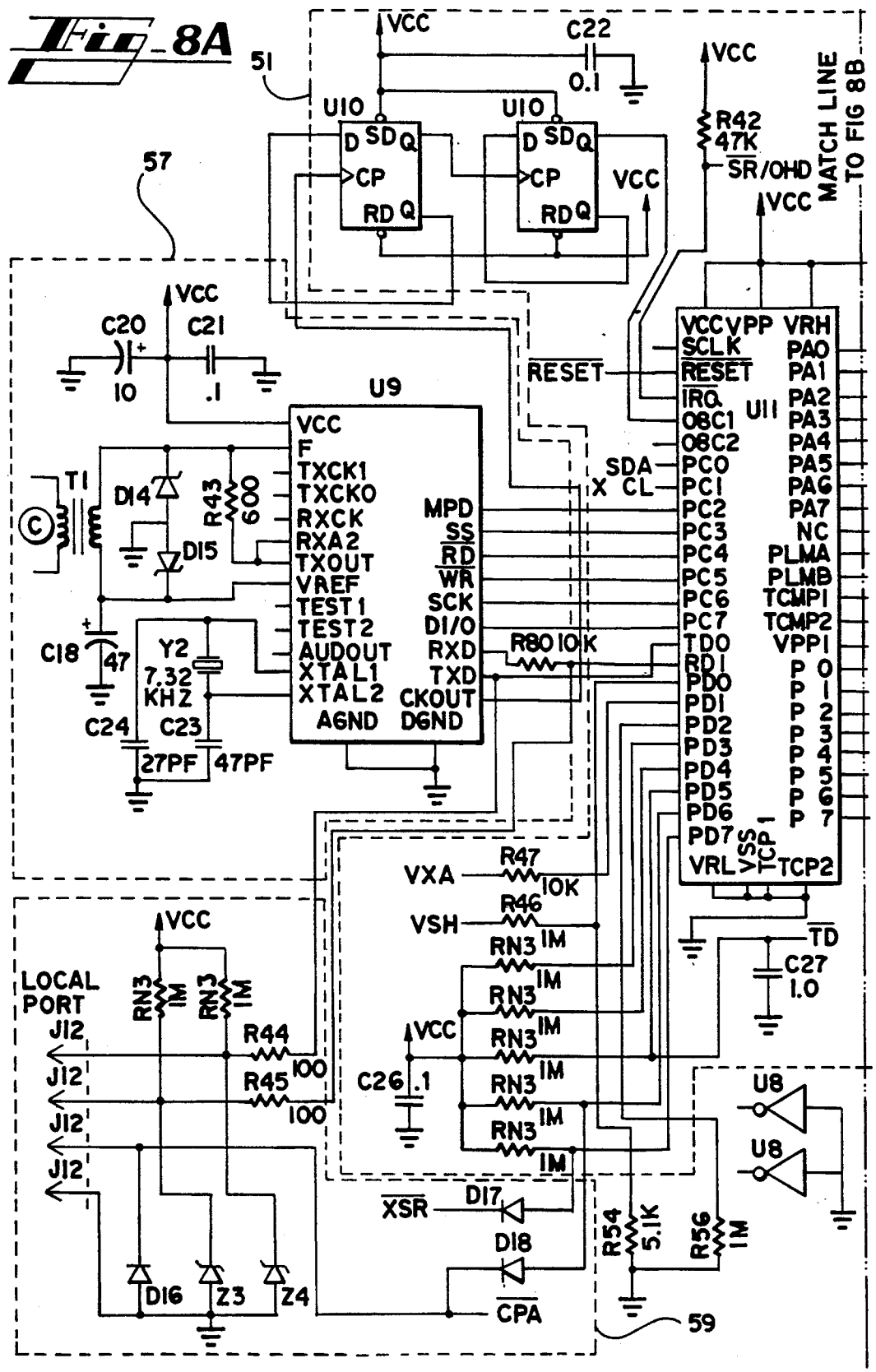

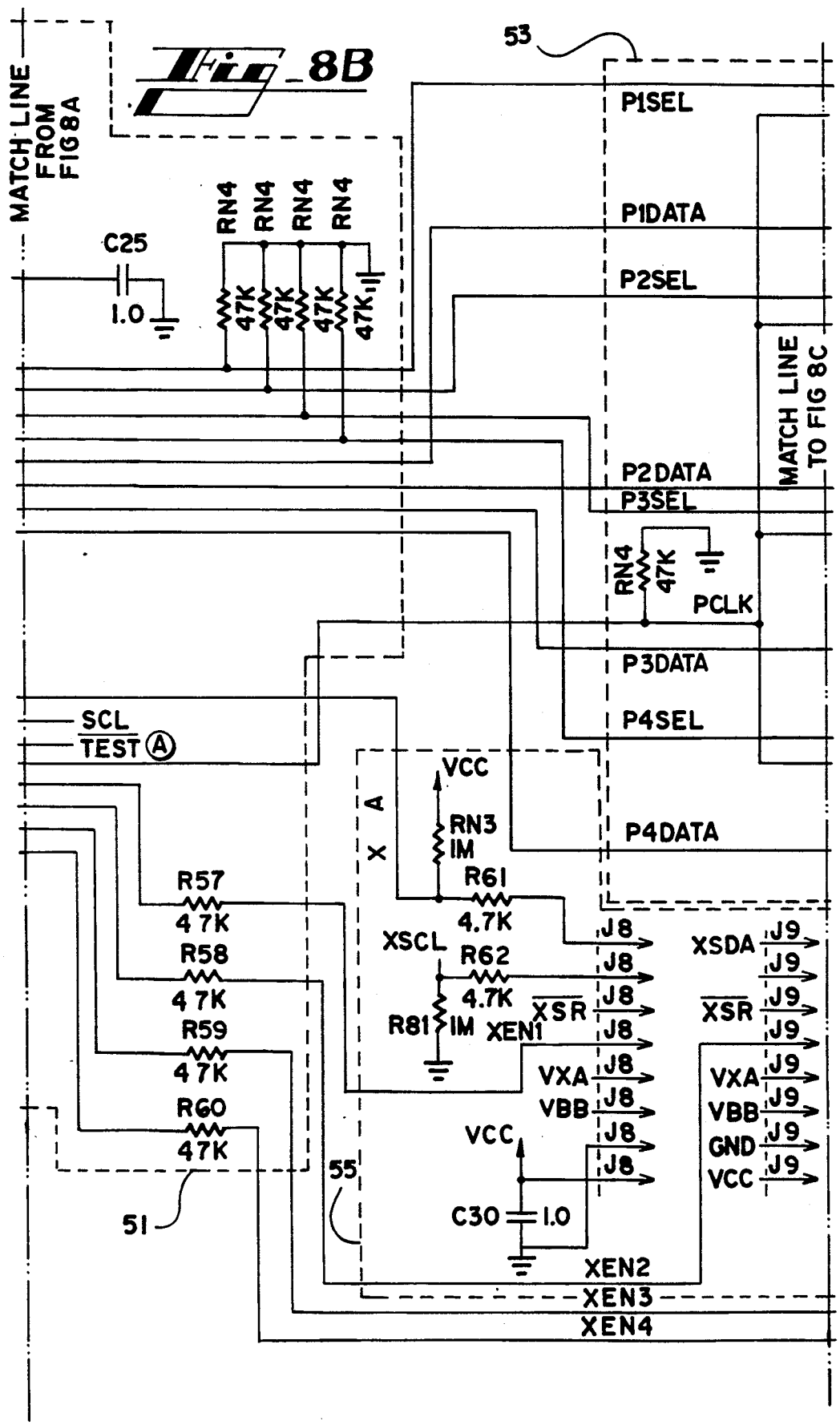
Fig_8B

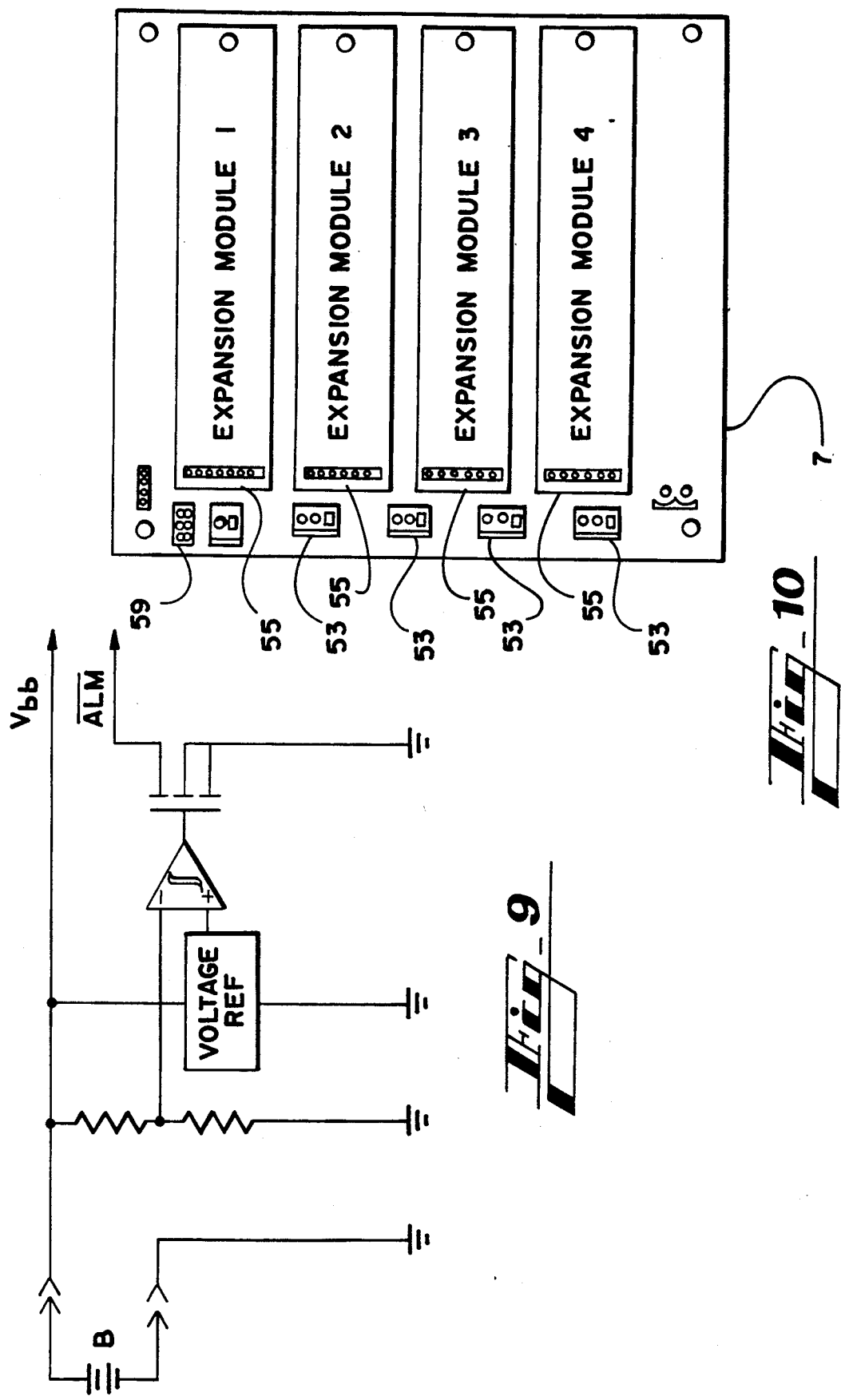

TELEPHONE DIAL-INBOUND DATA ACQUISITION SYSTEM WITH DEMAND READING CAPABILITY

BACKGROUND OF THE INVENTION

1. Field of the Invention

The invention relates to the field of remote data acquisition and, more particularly, to a system for periodically communicating data acquired by a remote data unit over a dial-up telephone line to a central computer and having demand reading capability.

2. Prior Art

There have been various attempts to provide remotely interrogable data acquisition units for the purposes of remotely and automatically reading data stored at these units. For example, in the utility industry, a remote data unit (RDU), also known as a meter interface unit (MIU), can be located at a customer's home or manufacturing site for accumulating utility consumption data (electricity, water, or gas) and for communicating this information back to a central computer located at the utility's home office. This type of system enables the utility to automatically and remotely read a customer's utility meter without having to send a person to the customer's location to physically read the meter.

Prior art automatic meter reading systems have generally used one of three forms of communication media. These are radio (RF), two-way interactive cable television (CATV), or dial-up telephone lines.

An example of an RF system is shown in U.S. Pat. No. 4,614,945, in which a mobile van interrogates an RF transponder attached to a meter to take the meter reading. However, this system suffers from the drawback that a vehicle must be driven within a few thousand feet of the meter in order to take its reading. Another drawback is that the RF transponder located on the meter is not suitable for use indoors due to attenuation of the low power 900 MHz signal used for communications. This limits the use of this device to meters which are located outdoors. In many areas of the country, however, meters (particularly water meters) are located indoors in basements.

The second type of system, which uses two-way interactive coaxial cable, is exemplified by U.S. Pat. Nos. 4,504,831 and 4,707,852. In these systems a remote data unit located at a customer's site periodically acquires utility meter consumption data and transmits it back to a central computer over a cable television coaxial cable. One drawback to this system is that it can only operate with a two-way interactive cable system since signal amplification is required from the customer's location back to the cable head-end. Also, two-way cable systems are relatively uncommon and therefore their use in automatic meter reading systems is limited.

Because of the foregoing limitations of RF and cable systems, the most effective remotely interrogable automatic meter reading systems in existence today utilize the dial-up telephone network as the communications medium. Telephone-based automatic meter reading (AMR) systems generally fall into two categories: so-called telephone "dial-outbound" systems and telephone "dial-inbound" systems.

A telephone dial-outbound system is exemplified by U.S. Pat. No. 4,582,152. In this system communication is established from a central (host) computer to a remote data unit located at the customer's site and connected to utility meters. Access to the RDU is made through a special subscriber test trunk which enables the host computer to be connected to a particular RDU without ringing a customer's telephone. This system has the advantage that the host computer can dial and access any RDU in the system at any time. This enables a utility to make a meter reading at-will, for example, when a customer has his service disconnected for the purposes of rendering a final bill. However, this system has the drawback of requiring special test trunk access circuitry which has to be installed at each telephone exchange within a utility's service area. This special circuitry enables the host computer to communicate with the RDUs connected through the particular exchange without putting a ringing signal on the customer's line. Another disadvantage is that this particular arrangement requires the cooperation of the local telephone company to purchase and install the special circuitry at each exchange.

An alternate to a telephone dial-outbound system is the telephone dial-inbound system. An example of such a system is shown in the above-mentioned U.S. Pat. Nos. 4,504,831 and 4,707,852. In one embodiment, a pseudorandom number generator is provided at the RDU which is used to randomly select a callback time for the RDU. When this callback time occurs, the RDU "wakes-up", dials the host computer's telephone number via a modem provided in the RDU and, upon making the connection with the host computer, transmits meter reading data back to the host. Randomization of the callback times is required since there can be several thousands of RDUs in a system. If all RDUs were to call back at the same time, only one would actually get through. By spacing the frequency of callback times sufficiently (e.g. once every thirty days) and using an appropriate pseudorandom number generation algorithm, the callback times can be spread out over the thirty day period, thus minimizing collisions in callback times. If a collision does occur, the RDU is programmed to pause for several seconds and retry the connection. If no connection is made after a predetermined number of retries, the RDU is reset.

One drawback to the aforementioned system is that throughput of the system is not optimized. Because of the nature of the randomizing sequence, it is possible that after an RDU is reset, it will call back in as few as two minutes or in as much as thirty days after the previous callback time. Without knowing the approximate time of reporting at the central computer, the database of meters which are expected to report in is difficult to manage. Furthermore, utilities generally try to schedule a reading of a customer's meter to fall on approximately the same day every month, so this system does not lend itself to accommodating a utility's usual meter reading practices. In addition, there is no way for the utility to call up the RDU and take an immediate (on demand) reading of a customer's meter.

Other telephone dial-inbound systems have attempted to improve the throughput of data transmission through various techniques. For example, in U.S. Pat. Nos. 4,241,237 and 4,455,453, an RDU is programmed to call the host computer at a precise real time, as indicated by an onboard real-time clock in the RDU. At the designated time, the RDU seizes the telephone line and transmits meter reading data to the host computer. The host computer then sends a signal containing the desired next real time of callback to the RDU where it is stored.

The host computer also sends a synchronization signal to force the real time clock at the RDU to synchronize with a master clock associated with the host computer.

Similarly, U.S. Pat. No. 4,056,684 shows a telephone dial-inbound system for remote alarm monitoring. Alarm monitoring circuitry at a customer's home periodically dials into a host computer to indicate proper operation of the system. The host computer downloads a desired time interval to the remote alarm monitoring unit. The remote alarm monitoring unit, which has a clock, then waits the appropriate amount of time, as indicated by the time interval data sent from the host unit, until it calls back again.

One drawback to the foregoing systems is that some allowance must be made for drift in the onboard real time clock at the RDU. This drift can be up to 200 parts per million. Over a thirty day period, this implies a possible drift of several minutes plus or minus the nominal desired callback time. Because of this, the host computer has to set aside a several minute block of time for each RDU to call back to avoid collisions due to onboard clock drift. For example, with a two minute interval callback spacing, the maximum number of RDUs which can phone on a single line in a thirty day period without a chance of a collision occurring is 21,600. Such a system cannot accommodate many large utilities, some of whom have well over 100,000 customers.

One common problem faced by designers of telephone dial-inbound data acquisition systems is the requirement that the RDU not interfere with the normal operation of a customer's telephone. Not only can such interference be annoying to a customer, who may find he cannot use his telephone when the RDU is attempting to access the host computer, but it can be potentially life threatening if the customer needs to use the phone to dial the police or fire department in an emergency. Therefore, many telephone companies require any sort of auxiliary device which is connected in parallel with the customer's telephone not interfere in any way with the normal operation of the telephone. Preferably, the RDU must be fail-safe in this regard—the RDU must not under any circumstance accidentally seize the line while a customer is using his phone, and must immediately release the line if the customer picks up the telephone handset to make a call.

In order to meet these requirements, some sort of "off-hook" detection circuitry must be employed. Circuitry for detecting whether a customer's telephone is on-hook or off-hook is shown, for example, in U.S. Pat. Nos. 4,469,917, 4,578,534 and 4,847,892. However, these circuits merely detect whether the voltage or other electrical characteristic of the telephone line has dropped below a predetermined level which is assumed to indicate an "off-hook" condition. However, the line voltage is dependent upon the type of telephone system, the particular electrical characteristics of the customer's line, the loading on the telephone system, and the type of equipment connected, thus it can vary significantly. Because of these factors, these types of circuits may falsely indicate an "off-hook" condition when, in fact, no such condition exists, or fail to detect the customer attempting to gain access to the line.

Other types of dial-inbound telephone-based automatic meter reading systems utilize a so-called "polling" or "interrogate and callback" scheme. In U.S. Pat. No. 4,469,917 a remote data unit is placed in an "alert" condition for a short period of time each day during which it waits for a single ringing signal to be transmitted from the host computer to the RDU. The first ring is intercepted so as not to ring the customer's telephone. If no subsequent ring is heard within a predetermined time period, e.g. five seconds, the RDU then immediately dials back the central computer and transmits the data to the host computer. In U.S. Pat. No. 4,345,113 the first incoming ring on a customer's line is intercepted without ringing the phone. The RDU then answers the phone and waits to hear a special tone sent by a host computer. If this tone is heard within a predetermined period of time, the RDU sends its data back to the host computer. If the tone is not heard, the RDU assumes the call is a normal one and disconnects the RDU.

U.S. Pat. No. 4,578,534 describes a telephone dial-inbound data acquisition system in which an RDU detects and intercepts a single ringing signal and causes the RDU to call back the host computer if such a single ring is detected. If more than one ring is detected, the RDU shuts down and allows normal operation of the customer's telephone.

U.S. Pat. No. 4,847,892 describes a telephone based data acquisition system in which an RDU has a real time clock and calls a host computer on a periodic basis, e.g. once a month. In addition, once a day, the RDU is placed in a "standby" mode for a call from the host computer. In this "standby" mode, if a single ringing signal is detected the RDU immediately calls back the host computer to transmit its current data. In this fashion, scheduled periodic data transfers take place without any action of a utility or the requirement that the host computer call up the RDU to take the reading. However, the RDU is capable of being accessed on a daily basis during the predetermined "window" during which the RDU is in its "standby" mode. This enables the utility to take a daily reading of a utility meter.

Systems such as those described above, wherein the RDU intercepts, absorbs or in any way eliminates the first ring do, in fact, interfere with the customer's normal telephone service. Customers in effect pay for ringing service and each ring carries incremental value. For example, an elderly person may have difficulty getting to the telephone in time to receive a call if one ring is eliminated. Therefore, it is not likely that telephone companies would allow installation of such systems on a broad scale.

Systems such as those shown in U.S. pat. Nos. 4,469,917 and 4,578,534 which require the host computer to first call up the RDU, the RDU to be alerted, and the RDU to hang up and immediately call back the host computer are inefficient. This is because it can take upwards of thirty seconds to complete each dial-up circuit, i.e. placing the call from the host computer to the RDU and then placing the call from the RDU back to the host computer. This, combined with the necessary overhead for transmitting data from the RDU back to the host computer, means that a typical reading cycle can take up to ninety seconds. This substantially reduces the throughput (number of RDUs accessed per unit time) of the system. In addition, these systems all rely upon some type of single ring detecting circuitry which, in an effort to not annoy a customer, typically eliminates the first ring, so that only the second and subsequent rings will actually be heard by a customer if the ring was not intended for alerting the RDU. Such systems also have the disadvantage that the single ring alerting circuitry could fail in the off-hook mode after detecting the first ring, thereby rendering the customer's telephone useless.

The type of telephone dial-inbound meter reading system where the RDU automatically calls the host at a predetermined time could be the most efficient in terms of throughput, if it were not for the problems associated with clock drift. Although various attempts have been made to overcome this problem, none have achieved sufficient efficiency to enable a large number of utility meters, e.g. 100,000 or more, to be efficiently read during a one month period on a single incoming telephone line. In addition, with the heavy capital expense associated with installing a telephone-based automatic meter reading systems, utilities generally not only wish to be able to read their meters on a periodic basis (e.g. monthly) but also to take on-demand readings of a meter when necessary to address billing complaints or conduct special reads. This is particularly true in urban areas where there is a large movement of households where connect and disconnect calls are frequent, necessitating taking a meter reading on a particular day to prepare a final bill for a customer.

Since telephone-dial-inbound automatic meter reading RDUs must be capable of operation during periods in which telephone line power may fail or not be available, they normally require some sort of onboard battery for backup power. While the use of some types of batteries, such as lithium batteries, in combination with low power consumption integrated circuit devices, have extended the time period over which an RDU may operate without needing a battery change, it is a very desirable feature that a utility be alerted when the battery power for a particular RDU begins to fall below a critical threshold. In addition, utilities have indicated the desire to know if the RDU or its associated utility meter is being tampered with. In either of the foregoing cases, low battery voltage or tampering indication, it would be desirable that the RDU immediately dial the host computer and identify the problem and its nature.

SUMMARY OF THE INVENTION

The present invention overcomes the various drawbacks of prior art telephone dial-inbound data acquisition systems while providing many desirable features.

More particularly, in a preferred embodiment the invention concerns an apparatus for transferring data over a telephone network comprising a remote data unit (RDU) and a host computer, with the remote data unit and host computer being interconnected over a dial-up telephone network. The remote data unit includes means for storing a desired callback start time and a real time clock for generating an indication of real time. The remote data unit also includes means for generating an offset time interval in a pseudorandom manner and means for adding the offset time interval to the desired callback start time to generate an actual callback time. This actual callback time is then continuously compared with the real time generated by the real time clock in the RDU. The call placement process is then begun by the remote data unit when the real time equals the actual callback time. The remote data unit then transfers data from the remote unit to the host computer. Subsequently, the host computer transfers a new callback start time to the remote data unit. Communications between the remote data unit and the host computer are then terminated.

In the normal mode of operation, i.e. transmitting meter readings, the actual communication time between an RDU and the host computer is only two to three seconds. Since system throughput is a critical issue for a large utility with hundreds of thousands of meters, it is important to allow as many RDUs as possible to report in a very short time period. With the foregoing arrangement, the remote data unit will call back during a predetermined "window" of time. The start of this time window is the callback start time transmitted from the host computer to the remote data unit during a prior communications session. The offset time interval, which is generated in a pseudorandom manner at the remote data unit, is then added to the callback start time. The resultant actual callback time (the callback start time plus the offset time interval) is then used as the next time of callback to the host computer. With this arrangement, several remote data units can be assigned identical callback start times, while the offset time intervals randomly generated at each remote data unit will cause the actual callback times to differ slightly during a predetermined window of time. This enables multiple RDUs to call a host computer during a relatively short (on the order of one and one-half minutes) "window" of time, while minimizing the chances of collisions between each call. The number of RDUs sharing a timeslot and the pseudorandomization algorithm can be selected to optimize channel loading. This dramatically raises the throughput of the system over prior art systems where each RDU calls back during a fixed or limited range of times.

Throughput of the present invention may be further improved by having the remote data unit calculate the next actual callback time while it is still in communication with the host computer and transferring this actual callback time indication to the host computer. The host computer may then compare this actual callback time with callback times of other remote data units within the system. If the host computer detects a conflict or uneven distribution of actual callback times, it can then signal the particular RDU, while it is still in communication with the host computer, to generate another offset time interval and calculate a new actual callback time until an acceptable actual callback time is indicated by the remote data unit.

In the preferred embodiment, the offset time interval is generated in a pseudorandom fashion by utilizing the "hundredths of a second counter" of the real time clock provided at the remote data unit. When the remote data unit accesses the telephone line, the count value of the hundredths of a second counter of the real time clock is sampled. Since the actual time that the remote data unit accesses a line will vary slightly, due to the amount of time it takes to dial up the host computer through the telephone network, the hundredths of a second digits, which are free running in the real time clock, will result in a random number between "00" and "99". Since there is no attempt to synchronize this counter with the host clock, the hundredths of a second count value of every RDU in the system will be random with respect to every other RDU. This number is then used as the number of seconds for the offset time interval for the next scheduled callback time. The host computer may download the next desired callback start time, to which the offset time interval is added, or the remote data unit may be programmed to use the same callback start time for the next reporting period as used previously. This approach maximizes the efficiency of the RDU program design by avoiding complex and lengthy mathematical randomization formulas.

Alternatively, the remote data unit may include means for mathematically computing a pseudorandom reporting time and means for comparing this pseudorandom time with a real time clock at the remote data unit. When the pseudorandom time report equals the real time, the remote data unit seizes the telephone lines, dials the host computer, and transfers data from the remote unit to the host computer. While still in communication with the host computer, the remote data unit then calculates a new pseudorandom time signal and transmits it to the host computer. The host computer contains a table of allowable callback times and compares this pseudorandomly generated time signal, which is indicative of the next desired callback time for the remote data unit, with all allowable callback times for all remote data units in the system. If the desired callback time is acceptable, the host computer acknowledges this and the remote data unit then uses this time as its callback time on the next call. If this time is not acceptable, the host computer so indicates and causes the remote data unit to recompute a new callback time, and then checks the availability with the host computer to see if the time is acceptable.

In this alternative embodiment, in addition to the desired start time, the host computer may also send an indication to the remote data unit of a range of allowable times so as to constrain the generation of the pseudorandomly generated time signal to the allowable range.

Other features of the present invention include circuitry for detecting an alarm condition at the remote data unit and, in response to such alarm condition, immediately accessing the telephone line and transferring a signal indicative of this alarm condition to the host computer. This alarm condition, for example, may be an indication of voltage of a battery powering the remote data unit dropping below a predetermined limit. Alternatively, the battery condition can be checked and reported to the host computer during a regularly scheduled communications session. The alarm condition can also be an indication of tampering with the remote data unit or a utility meter associated with the remote data unit. Preferably, tampering is detected by applying a periodic pulsed current to a conductive loop and detecting the continuity of this loop. If there is an indication of a lack of continuity, which could occur through the breaking of a conductive meter seal, the opening of a tamper switch, or the movement of a mercury switch, the alarm condition is generated. Pulsing the current on the loop has the advantages of conserving battery power at the remote data unit and being more noise immune. This is because a higher pulse of current may be applied to the conductive loop for a short period of time for the same size battery than would be practical if a continuous signal were applied to the loop, and because any noise induced in the loop is ignored except during the sampling period in which the pulse is applied.

The invention further includes circuitry for detecting whether the telephone line is in an on-hook or off-hook condition. This circuitry includes means for detecting the electrical characteristics associated with on-hook and off-hook conditions for a particular remote data unit and other devices and telephones connected to a customer's telephone line. For example, the off-hook condition detecting circuitry can include means for detecting the tip-to-ring voltage on the telephone line and disconnecting the remote data unit from the telephone line when this voltage drops below a predetermined value. The off-hook condition detecting means also contains circuitry for blocking access to the telephone line by the remote data unit if the tip-to-ring voltage falls below a predetermined value. In this fashion, the remote data unit is prevented from seizing the telephone line if an off-hook condition is detected, e.g. where a customer is using a phone. The RDU will also immediately disconnect from the host computer if it detects that the customer has taken the phone off-hook. Both of these features are important because a remote data unit must not interfere with the normal operation of a customer's telephone and must make the telephone immediately available in the case of emergencies.

Prior art on-hook/off-hook detection circuits generally only to look to see whether the voltage on the telephone line has fallen below a certain fixed threshold value, where this threshold value is considered to indicate an off-hook condition. However, it has been found that not only does the normal "on-hook" voltage in a dial-up telephone network vary considerably from customer line to customer line, but the amount of voltage drop at a particular customer site may vary due to the number of phones or other devices such as data sets that are interfaced with the telephone line and which draw current from the line. By using analog to digital conversion circuitry in conjunction with a microcomputer dedicated to monitor line characteristics, the present invention provides the capability to adapt the RDU to numerous telephone line environments. The present invention provides a more accurate and reliable off-hook condition detecting scheme by establishing and storing an initial baseline of actual on-hook and off-hook voltages for a particular telephone line to which the RDU is connected and then monitoring the line voltage for changes which result in the ratio of the baseline on-hook or off-hook voltage to the respective monitored on-hook or off-hood voltage falling below a predetermined value. This system not only prevents accidental seizure or failure to release in the presence of an off-hook condition, but also prevents the RDU from being locked out from access to the telephone line if the telephone line voltage drops below a predetermined value, even through this predetermined value does not actually indicate an off-hook condition. This method also allows the RDU to "learn" its respective telephone line characteristics and adapt its operating limits accordingly, thereby greatly enhancing its capability of operating under varying telephone line conditions. With prior art off-hook detection circuits which merely detect whether the telephone line voltage is above or below a predetermined level, the RDU could falsely believe that the customer's telephone was off-hook even though it was actually not, due to the supply voltage fluctuating below the preset level. The present invention also improves upon prior art methods by providing the capability of detecting an off-hook condition during pulse dialing.

A further feature of the present invention is that the remote data unit includes circuitry for detecting a predetermined number of normal ringing signals applied to the telephone network. In response to the detection of such predetermined number of ringing signals, the remote data unit accesses the telephone network and establishes communication between the host computer and remote data unit. This arrangement enables a utility to dial-up the remote data unit on demand to take a meter reading at any time. The ring signal detection circuitry may be programmed to respond to one or more normal rings which would be heard by a customer. Preferably the number of rings is one. If more rings than the predetermined number are detected, the RDU assumes it is a regular telephone call and takes no further action. If a single (or other predetermined number) unanswered ring is detected, the RDU then immediately calls back the host computer to transmit its data. This allows polling of the remote data unit at any time by a utility. The first ring is not intercepted as in the case of some prior art units, but is allowed to ring a customer's telephone. If a customer does not pick up the telephone, then the RDU will initiate its callback as described above. If the customer picks up his telephone, assuming that it is a call for him, a utility company operator would instruct the customer to allow his phone to ring one time unanswered, so the meter can be read automatically. The first ring is not intercepted, absorbed or in any way eliminated since some telephone companies do not find this practice to be acceptable. Furthermore, some types of single ring detection circuits which intercept the first ring could potentially fail in an off-hook condition, thereby rendering a customer's telephone inoperative.

An additional feature of the present invention is the provision of an expansion bus at the remote data unit. The expansion bus accepts auxiliary circuit cards for direct communication with the remote data unit. These auxiliary circuit cards could implement additional desirable features, such as additional memory for the RDU, demand recording capabilities, time of use billing capability, energy management controls, pulse accumulator, radio frequency data link, or the like.

The circuitry of the present invention is designed using low power integrated circuitry to minimize battery drain and thereby prolong the period of time between battery replacement. Furthermore, it is contemplated that the circuitry of the remote data unit may be placed in a separate enclosure remote from the utility meter. Alternatively, the circuitry for the remote data unit may be integrated into the mechanical components of a meter register (e.g. a water, gas, or electric meter).

BRIEF DESCRIPTION OF THE DRAWING FIGURES

These and other features and advantages of the present invention will be described in more detail in the following detailed description of the preferred embodiments when taken in conjunction with accompanying drawing figures wherein:

FIG. 1 illustrates the overall arrangement of a remote data acquisition system utilizing the principles of the present invention;

FIG. 2 shows a utility meter incorporating an on-board remote data acquisition unit;

Figure 6A:
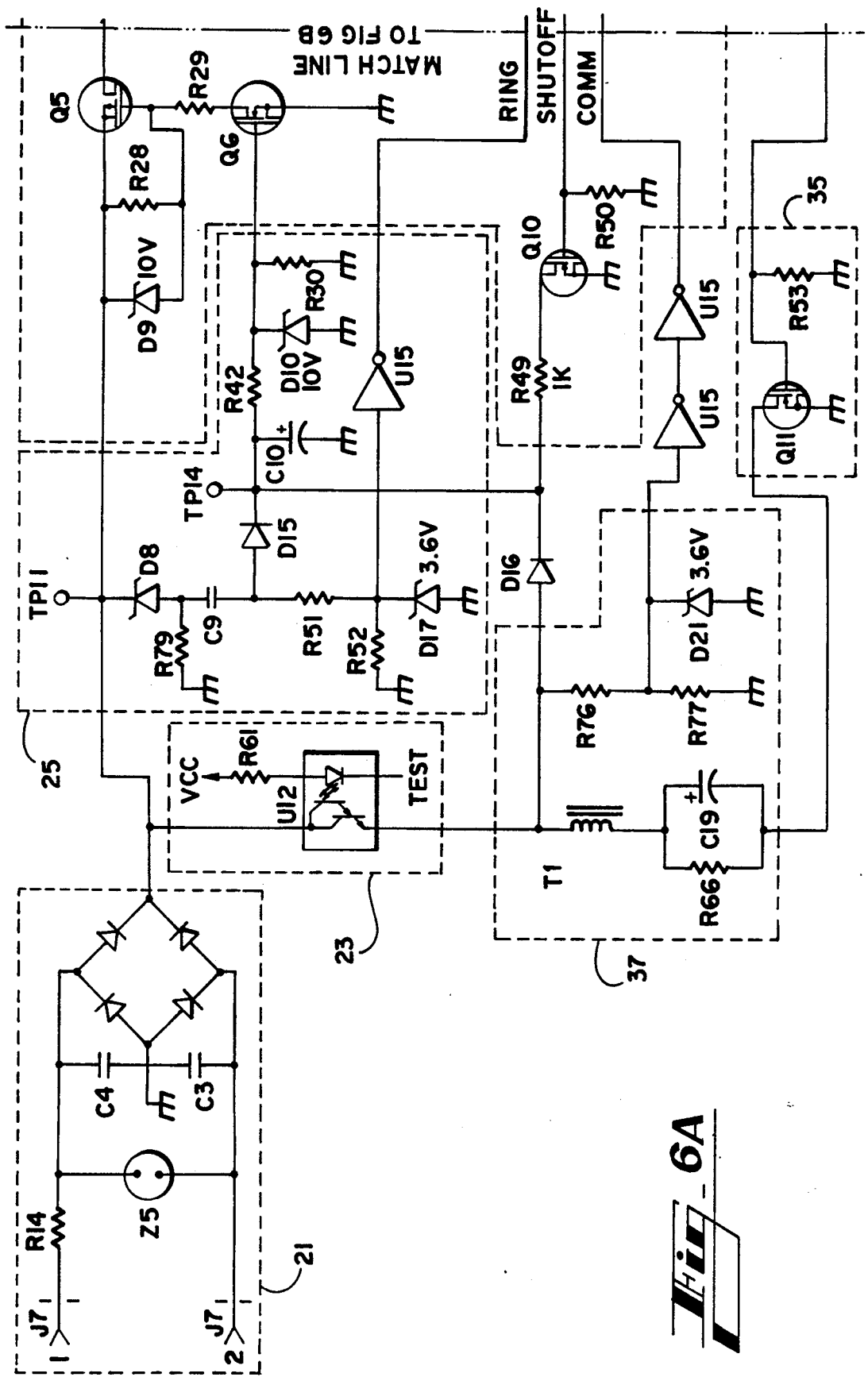

FIGS. 3, 4 and 5, when taken together, constitute a block diagram for the remote data unit of the present invention;

FIGS. 6A, 6B, 7A, 7B, 8A–8C are detailed schematic diagrams of the blocks shown in FIGS. 4, and 5, respectively.

FIG. 9 illustrates a low battery warning circuit which can be incorporated into the power supply shown in FIG. 7; and FIG. 10 shows the arrangement of expansion bus ports for the remote data unit shown in FIGS. 3–8.

DETAILED DESCRIPTION OF THE PREFERRED EMBODIMENTS

FIG. 1 shows an overall arrangement of the remote data acquisition system of the present invention. A host computer 1, which may be an IBM PC or compatible or other type of computer, is connected to dial-up telephone line 3 via a telephone modem 4. Telephone line 3 is connected to a local telephone exchange 5. Telephone exchange 5 is connected to other similar exchanges in a well known fashion. Each telephone exchange 5 is connected to a customer site via local line 6. At each customer site, there is provided a remote data unit (RDU) 7 whose construction and operation will be described in more detail below.

Each RDU 7 is connected via a communications channel 9 with a utility meter, such as a water meter 11, electric meter 13 or gas meter 15. Communications channel 9 may comprise wires, coaxial cable, optical fiber, a radio frequency link, or the like. Communications channel 9 enables communication between the register associated with a utility meter 11, 13, or 15 and its associated RDU 7, so that the amount of water, electricity, or gas indicated by these meter registers may be communicated to its associated RDU 7. As will be described in more detail below, each RDU 7 is capable of reading up to eight different meters or sources of data signals at a time.

Each RDU 7 is connected in parallel to local telephone line 6. Associated with each line 6 is a customer's telephone or other type of telephone data set 17.

Preferably, the utility meter registers associated with meters 11, 13, or 15 are of the "absolute-encoder" type; i.e. encoder wheels associated with the meter register display encode the reading of the display so that when circuitry associated with the meter display is interrogated, the encoded register reading corresponds with the amount visually shown on the register display. Such an encoded register and associated circuitry is shown in U.S. Pat. No. 4,085,287.

Alternatively, a meter register may count pulses generated by the motion of the measuring element of its associated meter 11, 13, or 15. These pulses may be accumulated in a memory device associated with the meter register or accumulated by its associated RDU, as described in more detail below.

In this fashion, data indicative of the consumption of water, electricity or gas can be communicated to an RDU 7.

As described in more detail below, each RDU 7 contains circuitry for automatically and periodically dialing up host computer 1 via telephone line 3 and 6 for communicating this consumption data back to host computer 1. Each RDU 7 further includes circuitry which is responsive to a ringing signal initiated by host computer 1 to cause RDU 7 to immediately call back host computer 1 at times other than its periodic automatic callback time. This enables a utility to take a reading of utility meters 11, 13, or 15 on demand.

FIG. 2 illustrates an alternative embodiment wherein the circuitry associated with each RDU 7 is integrated within the same enclosure 19 containing the utility meter register associated with utility meters 11, 13, or 15. This integrated RDU/register 19 has the benefit of eliminating an additional enclosure which would otherwise be required for an RDU 7 shown in FIG. 1. It also eliminates the need for a separate communications channel 9 between an RDU and its associated utility meter and minimizes unit cost.

The circuitry forming RDU 7 (or the integrated version 19 as shown in FIG. 2) is shown in block diagram form in FIGS. 3, 4, and 5. FIGS. 6A, 6B, 7A, 7B, 8A–8C are detailed schematics of the correspondingly numbered blocks shown in FIGS. 3, 4, and 5.

Block 21 is the telephone line transient suppression circuit. Circuit 21 is connected to local telephone line 6 and serves the purpose of rectifying the telephone line voltage to allow either polarity of the tip-to-ring connection to function identically. Connected to transient suppression circuit 21 is hook-switch circuitry 23 which is activated by "back end" microprocessor 51. Hook-switch circuitry 23 is activated whenever microprocessor 51 determines that it is time to initiate a callback to host computer 1. Such a call only occurs after telephone line 6 is tested to see whether it is available (that is, if an on-hook condition is detected). Line testing occurs when microprocessor 51 activates hook-switch circuit 23. This initiates the powering up of the circuitry shown in FIGS. 3 and 6A, 6B to test the line and determine that it is available (on-hook).

If telephone line 6 is in an on-hook condition, microprocessor 51 proceeds normally to place a telephone call to host computer 1. However, if telephone line 6 is determined to be in an off-hook condition, microprocessor 51 takes certain steps to prevent RDU 7 from initiating such a call.

More particularly, microprocessor 51 controls the status of hook-switch circuitry 23 by clocking data into local telephone line microcontroller 31. Data is clocked into microcontroller 31 indicating what the tip-to-ring voltage on the telephone line should be. Local microcontroller 31 is powered up through power supply 27. The tip-to-ring voltage is sensed through line sense circuit 29. The output of line sense circuit 29 is applied to an A-to-D converter incorporated as part of microcontroller 31. The A-to-D converter generates a digital representation of the tip-to-ring voltage and compares to a programmable reference level representative of an off-hook condition. The reference level can be a ratio of the previous result of measuring the tip-to-ring voltage during installation, or it can be remotely programmed by the host computer. Prior to seizing the line, RDU 7 compares an average of the current line voltage to this reference level, and if greater or equal to, the line is assumed to be "on-hook" and available for use by RDU 7. If this voltage is less than the reference level, the line is assumed to be "off-hook" and therefore, unavailable for use at that time.

Microcontroller 31 then activates a second hook-switch circuit 35. Hook-switch 23 and second hook-switch 35 provide redundant protection from RDU 7 going off-hook accidentally. This arrangement prevents either microcontroller 31 or back-end microprocessor 51 from independently causing RDU 7 to seize telephone line 6 and go into an off-hook condition. Both microcontroller 31 and microprocessor 51 must be activated at the same time and activate their respective hook-switches 35 and 23 before telephone line 6 can be seized.

Watchdog timer 47 also prevents RDU 7 from remaining in an off-hook condition for more than a predetermined amount of time, e.g. four minutes. If watchdog timer 47 has not been reset by microprocessor 51 within this predetermined time period, power supply 41 is turned off causing RDU 7 to shut down. This prevents RDU 7 from accidentally locking up and seizing telephone line 6 in the event of a component failure or error.

Modem signal coupling transformer 37 couples signals from modem 57 to the telephone lines 6 via hook-switch 23 and transient suppression circuit 21. Data signals are applied from microprocessor 51 to modem 57 in a well known fashion. These data signals may be, for example, data indicative of a utility meter reading, an alarm condition, a low battery indication, tampering indication, or the like.

An important feature of the present invention is that after microcontroller 31 and microprocessor 51 have caused RDU 7 to seize telephone line 6, microcontroller 31 continuously monitors the telephone line voltage via line sense circuitry 29 in order to determine whether a telephone or other data set device 17, which is connected in parallel to telephone line 6, has gone off-hook. Most telephone companies require that any auxiliary device connected to the telephone line, such as RDU 7, automatically and immediately disconnect from the telephone line in the event a customer wishes to use the telephone or other telephone data set. Ideally, this should be done quickly and without any interference to the customer's normal use of his telephone. This also represents a safety feature in the event the customer needs to use his telephone in an emergency, e.g. to telephone the police or fire department.

Line sense circuitry 29 in combination with the circuitry of microcontroller 31 accomplishes this by continuously monitoring the voltage of telephone line 6 and calculating an average of the voltage on the line to determine when any changes have occurred which would indicate another device connected to lines 6 going off-hook. More particularly, after RDU 7 has seized the line, it again measures the tip-to-ring voltage. This measurement is then used as a basis for determining subsequent customer off-hook conditions. The MIU continually samples and measures the tip-to-ring voltage and if this voltage falls to a specific ratio of the original measurement (for example 75%) or less, RDU 7 assumes a parallel off-hook condition has occurred. To improve the reliability of the process, and to reject spurious noise on the line, RDU 7 averages the measurements and uses the running average to determine the telephone line status. Additionally, if the tip-to-ring voltage falls below the minimum operating requirement of the off-hook detect circuitry (29 and 31), the circuitry will signal this to microprocessor 51 as an off-hook condition prior to shutting itself down. If such a condition is detected, microcontroller 31 also signals this via optocoupler circuit 33 to the back-end microprocessor 51. At this point, both microcontroller 31 and microprocessor 51 send signals to respective hook-switches 35 and 23 to immediately release telephone line 6 so that RDU 7 appears to be on-hook. This can be performed in less than 300 milliseconds so that by the time a customer has brought the handset of his telephone 17 to his ear, he will only hear silence. The customer must depress the hook-switch on his or her telephone to get a dial tone, but this is a typical and normal requirement.

The use of two independently controlled hook-switch circuits 23 and 35 ensures that RDU 7 will operate in a fail-safe condition. If either hook-switch should somehow fail in the "off-hook" condition, the other one would still be capable of placing RDU 7 back in an on-hook condition. Furthermore, both microcontroller 31 and microprocessor 51 have the ability to detect whether their respective hook-switch circuits 35 and 23 are cycling properly between the on-hook and off-hook states and can disable RDU 7 from further operation if a fault has occurred, or can signal host computer 1 that a faulty condition exists when RDU 7 is next scheduled to call back host computer 1. While characterizing and testing the line voltage is preferred, detecting other electrical characteristics of the telephone line, e.g. line current or tip-to-ring resistance, can also be employed to achieve similar results.

Another important feature of the present invention is the ability of RDU 7 to immediately respond to a polling or interrogation signal applied to the RDU 7 over telephone line 6. The polling signal is defined as a single ringing signal on telephone line 6 which is unanswered after five seconds. Alternatively, instead of a single ring, RDU 7 may be configured via a field-installed jumper to respond to any n umber of unanswered rings for use in an application where RDU 7 is the only telephone device coupled to line 6 or where line 6 is a leased line. In either case, whether it is a single ring or multiple rings, the operation of RDU 7 is the same.

Where RDU 7 is configured to respond after a single ring, this ringing signal is detected by power supply circuit 27 which is activated and draws minimal direct current from the telephone lines 6. The amount of current is not enough to cause an off-hook condition but is sufficient to operate ring detect circuitry 25, line sense circuit 29 and microcontroller 31. This amount of current is a maximum of three milliamps, and the circuitry of the present invention actually draws less than one-half milliamp.

Once power supply 27, ring detect circuit 25, line sense circuit 29, and microcontroller 31 are powered up, microcontroller 31 monitors the ringing signal on telephone line 6 to determine whether the ringing signal is a valid one and that it is at least 500 milliseconds long. Microcontroller 31 then continues to monitor telephone line 6 for five seconds after the ringing signal stops to see whether the telephone line is in an off-hook condition, as sensed by line sense circuit 29, indicating that someone has picked up a telephone or data set 17 associated with the telephone line 6. If an off-hook condition is detected, this is communicated to microcontroller 31 which then causes power supply 27 to shut down. Power supply 26 will also deactivate if more than the predetermined number of rings (e.g. one) is sensed by ring detect circuitry 25 and microcontroller 31.

Assuming that a single polling ring is sensed, and telephone line 6 is otherwise in an on-hook condition, microcontroller 31 then assumes that it has received a legitimate polling signal. Microcontroller 31 then causes the remaining circuitry shown in FIGS. 4, 5, 7A, 7B, 8A-8C to be powered up via ring indicator/optocoupler circuit 33. This signal "SRA" is applied to the back-end power supply 41 and microprocessor 51. This causes microprocessor 51 to take a reading of the encoded register associated with utility meters 11, 13, or 15 via meter interface ports 53 (typically four in number). This data is then formatted as a serial data stream and applied to modem 57 which includes a telephone dialing circuit for dialing the telephone number of the host computer 1. The modem signal is applied to the modem signal coupling transformer 37. Microprocessor 51 also causes hook-switch 23 to be activated and microcontroller 31 causes the second hook-switch 35 to be activated. This allows RDU 7 to seize telephone line 6 and receive the signal from modem 57 to be coupled via coupling transformer 37 to telephone line 6. Data is then sent from RDU 7 to host computer 1 via local telephone line 6 and the dial-up telephone line 3. Upon completion of the sending of data, microprocessor 51 causes power supply 41 to be turned off and hook-switch 23 to be returned to the on-hook condition. Microcontroller 31 is also signaled to place the second hook-switch 35 in the on-hook condition and to inactivate the front end power supply 27 to take RDU 7 off-line from telephone line 6. This single ring polling feature does not require the customer to be at home if the utility wishes to poll the customer's RDU, as is the case with some types of prior art RDUs.

Ring detection circuitry 25 also includes a feature whereby a customer can answer his telephone within the first five seconds after a single ring appears on the telephone lines and if the telephone is returned to the on-hook condition before the five seconds expires, this will still indicate a valid one ring polling signal. This increases the probability of a single ring polling signal cutting through and activating RDU 7.

The foregoing arrangement has the advantage of ensuring a reliable detection of a polling signal applied to a customer's RDU without interfering in any way with the customer's use of his telephone. Additionally, unlike some prior art single ring detection circuits, the single ring detection circuit 25 of the present invention does not attempt to suppress or "capture" the first ringing signal applied to a customer's telephone lines. Some prior art devices do this in an effort not to annoy the customer with a single isolated ring. However, a number of telephone utilities will not authorize such ring detect devices which suppress the first ring on a customer's line, either as a matter of policy or because it has been found that such circuits can interfere with the operation of other telephone devices or data sets coupled to a customer's telephone line. Further, eliminating a single ring can make it more difficult for elderly or handicapped people to answer the telephone.

This polling mode of operation enables a utility to individually poll or interrogate a particular RDU and get an immediate, real time, meter reading from its associated meter register. This is especially beneficial when a utility needs to take a customer's meter reading on other than the usually scheduled day or time, such as when a customer has a billing complaint or is moving out of a home or apartment and a final meter reading must be taken.

In addition to the polling mode of operation, RDU 7 also may be activated in three other ways. RDU 7 may be programmed to periodically call host computer 1 on a predetermined schedule. The RDU may also be awakened to call back to the host computer if an alarm condition is detected (e.g. tampering or a low battery). RDU 7 may also be activated through an external service request "XSR" applied from an auxiliary circuit card or other external device coupled to expansion ports 55 of RDU 7.

In the automatic callback mode, RDU 7 is initially set up with a desired callback start time which is stored as a digital representation of hours, minutes, and seconds in real time clock 45. This desired callback start time is monitored by microprocesor 51 to ensure that it is a valid time (e.g. February 31st would not be accepted). If it is not a valid time, RDU 7 will request host computer 1 to upload another time until a valid callback start time is accepted by RDU 7.

Once this callback start time has been stored, a free running counter associated with real time clock 45 counts in increments of 100ths of a second and is sampled. The sampled 100ths of a second digits are used as the amount (one second per count) of offset time interval to be added to the previously stored callback start time. The free running 100ths of a second counter continuously counts between "00" and "99". Due to inherent, random delays in the amount of time it takes to establish communications with the host computer, the value of the 100ths of a second counter when it is sampled will result in the random sampling of a number between "00" and "99". This number is then added to the seconds position of the previously stored callback start time. Thus, for example, if the callback start time were set initially for 1:10 a.m. and the 100ths of a second counter associated with real time clock 45 were sampled at "50", fifty seconds would be added to the callback start time to generate an actual callback time of 1:10:50 a.m. If the 100ths of a second counter were sampled, for example, at "75", seventy-five seconds would be added to the callback start time to generate an actual callback time of 1:11:15 a.m. Thus, the free-running 100ths of a second counter associated with the real time clock 45 can generate an offset time interval in the range of 0–99 seconds in essentially a pseudorandom manner without burdening the microprocessor with random number computations.

The actual callback time (the initial callback start time plus the offset time interval) is continuously compared with the real time as generated by real time clock 45. When these two times are the same, real time clock 45 generates a signal "ALM" which turns on the back-end power supply 41. This, in turn, causes the rest of the circuitry associated with RDU 7 to be powered up. The front end microcontroller 31 checks telephone line 6 via line sense circuitry 29 to ensure that telephone line 6 is in an on-hook condition. Microprocessor 51 then applies a signal "TEST" to hook-switch 23 and microcontroller 31 applies a signal to second hook-switch 35 to place RDU 7 off-hook. Microprocessor 51 then initiates a dialing sequence via modem 57 and coupling transformer 37 to dial the telephone number associated with host computer 1. During this process, line sense circuitry 29 continues to monitor the voltages associated with telephone line 6 to determine whether a telephone or other data set 17 of a customer is being taken off-hook. If such a condition is detected at any time, microcontroller 31 will cause RDU 7 to be immediately deactivated so that a customer may use his telephone or other data set normally. Line sense circuitry 29 also will prevent RDU 7 from waking up and attempting to seize the telephone line at its scheduled callback time if it senses that telephone line is already in an off-hook condition, indicating that a customer is presently using his telephone or data set. In such a case, RDU 7 automatically schedules a new reporting time based on a retry algorithm.

Assuming that telephone line 6 is free for use, RDU 7 then dials host computer 1 at the time indicated by the sum of the callback start time and the randomly generated offset time interval. Once a communications link has been made between RDU 7 and host computer 1, RDU 7 then proceeds to send data in a serial fashion indicative of various types of information it has acquired and/or stored. This information can be, for example, data indicative of the meter reading of a utility meter, such as meters 11, 13, or 15. Other information, such as the status of devices coupled to expansion bus ports 55, the voltage of battery B, (see FIGS. 4 and 7) may also be transmitted at this time.

Upon the completion of transmission of data from RDU 7, host computer 1 may send an indication of the next desired callback start time to RDU 7 for storage in real time clock 45. The pseudorandom offset time interval is then immediately calculated, as described above, and added to the new callback start time to generate the next actual callback time. This actual callback time is then transmitted as data from RDU 7 to host computer 1 which then compares it with other acceptable times it has stored in computer memory. If this next actual callback time is acceptable to the host computer, an acknowledgment signal is sent to RDU 7 and RDU 7 then proceeds to disconnect itself from telephone lines 6. If this next actual callback time is not acceptable, as determined by host computer 1, host computer 1 will send a "veto" signal to RDU 7 requesting it to regenerate a new actual callback time. If RDU 7 receives such a request, it samples the free running counter associated with real time clock 45 again to generate a new offset time interval. This offset time interval is then added to the previously uploaded callback start time to generate a new actual callback time. This new actual callback time is then transmitted back to host computer 1 which, again, compares it with its table of acceptable callback times. In this mode of operation, this process will be repeated as many times as is necessary to have an acceptable actual callback time generated by RDU 7.

The foregoing arrangement has a number of advantages over prior art devices which require the RDU to callback at a precise time. As explained earlier, such devices are subject to problems associated with clock drift which can amount to several minutes over a thirty day period. Because of this, the host computer must schedule each RDU to phone in at times which are sufficiently spaced apart to minimize the chances of two RDUs calling in at the same time. For example, with a two minute interval callback spacing, the maximum number of RDUs which can phone in a twenty day billing period without a chance of a collision occurring is 14,400. However, many large utilities have in excess of 100,000 customers. For such prior art devices to be usable with utilities having such a large customer base requires either the use of multiple host computers, which is expensive, or the use of multiple incoming telephone lines and a multiplexer, also an expensive solution. In the previous example, such a prior art system would require at least 7 incoming telephone lines to support a customer base of 100,000.

The arrangement of the present invention can increase this throughput by at least a factor of ten, i.e. from one call every two minutes to a call every twelve seconds. In normal operation through a local telephone exchange, and using DTMF (Touch Tone ™) dialing, it can take anywhere from 3–10 seconds to dial the host computer number and have it answer. A few seconds are required for the modem of RDU 7 and the host computer to establish communications. Two or three seconds are then required for RDU 7 to send its data to host computer 1 and for host computer 1 download the next desired callback start time. Disconnection time generally amounts to under one second.

Under average conditions, it takes approximately 15–20 seconds total for RDU 7 to dial up host computer 1, transfer its information, receive the next desired callback start time and disconnect itself, however, only about 5-10 seconds of this is the actual usage time of the host computer's line. This implies that nine or more RDUs on average may be assigned an identical callback start time by host computer 1. This is because these nine or more RDUs will call back at different random times within a 99 second "window" beginning at the callback start time assigned by host computer 1. Thus, in an average case, nine or more RDUs may telephone back within a predetermined 99 second time interval as opposed to one RDU telephoning back within a 120 second time interval as is the case with prior art RDUs which only call back at exact, preassigned scheduled times. Thus, the present invention can handle utility accounts with over 100,000 customers or meters without the necessity of using additional host computers, additional telephone lines or multiplexers. In the same twenty-day interval, the maximum number of RDUs which can report in would exceed 175,000, using a single telephone line. Multiple telephone lines could be utilized for redundancy and to increase throughput, but the number of lines required would be only a fraction of the number required for prior art systems.

Instead of downloading the next callback start time during each communication session, the initial default callback start time, as currently stored in RDU 7 may be reused. This is especially useful where a utility desires its RDUs to phone in meter readings at approximately the same time on a particular day each month.

In the unlikely event that an RDU 7 dials up host computer and gets a busy signal, RDU 7 uses a retry algorithm with programmable intervals to determine the next callback attempt time. If RDU 7 is unable to establish communications with host computer 1 after several tries, RDU 7 will default to attempting to call the host once per day.

Host computer 1 contains a table of all the identification numbers for RDUs connected to its system so that if a particular RDU does not call in at its scheduled time, the utility will be alerted to this fact and then can poll any RDU whose data has not been transmitted in accordance with the single ring polling scheme previously discussed.

As an alternative to the foregoing scheme, it is possible to use the free running counter of real time clock 45, and/or the free-running counters integral to the microcontroller 51, to generate a callback time in a pseudorandom fashion. This callback time is then compared with the time indicated by the real time clock. When this pseudorandomly generated callback time and the real time bear a predetermined relationship to each other, the RDU is awakened and dials up host computer 1. As in the previous embodiment, this pseudorandomly calculated next time of callback can be transmitted to host computer 1 prior to termination of a communication session between RDU 7 and host computer 1. Host computer 1 can then determine whether this time is acceptable and, if not, cause RDU 7 to generate another callback time until one which is acceptable to host computer 1 is generated. Host computer 1 can be programmed to send a range of allowable callback times to RDU 7 so as to constrain the generation of the next callback time to fall somewhere within this range. This latter embodiment produces essentially the same results as the previously discussed embodiment, except that it is a more random process because the host computer 1 does not send an explicit indication of the next callback start time in this latter embodiment.

In addition to dialing up host computer 1 on a regular schedule, RDU 7 is programmed to call host computer 1 if any alarm conditions are detected. These alarm conditions may be, for example, an indication of tampering with RDU 7 or its associated utility meter or the detection of a low battery level of battery B.

Tamper detection is performed by tamper detect circuitry 49. Tamper detect circuitry 49 is turned on periodically (e.g. every 16 seconds) by watchdog timer circuitry 47 which contains a crystal oscillator operating at 32 kHz. Watch dog timer circuitry 47 is powered by 3 volt power supply 43 which operates off the approximately 7 volt lithium battery B shown in FIGS. 4 and 7.

When tamper detect circuitry 49 is turned on, a 20 millisecond pulse of 1.5 milliamp current is applied to lines L1 and L2. Lines L1 and L2 constitute a closed conductive loop. This conductive loop, for example, may run through a closure seal of RDU 7 or a meter register associated with registers 11, 13, or 15. If the enclosure for RDU 7 is opened or a register associated with utility meters 11, 13, or 15 is removed, the conductive loop L1, L2 will be broken. Tamper detect circuitry 49 checks the continuity of lines L1, L2 by looking for a return of the pulse applied to the loop. If no such pulse is detected at the time the pulse is applied, the tamper detect circuitry sends a tamper signal to power supply 41 which causes RDU 7 to be awakened and to dial up host computer 1. RDU 7 then transmits a tamper indicating signal to host computer 1 to alert utility personnel of the occurrence of an alarm condition at RDU 7 or its associated utility meter.

More particularly, any time that tamper detection loop L1, L2 is broken, the pulsed tamper signal is no longer shunted to the ground and therefore is detected by tamper detect circuit 49. A voltage is applied to the base of Q9 of tamper detection circuit 49, which begins to conduct as well as Q10 which conducts in phase with the applied pulse to discriminate noise from causing a false tamper indicating signal. If the signals are in phase, then the tamper indicating signal at the collector of Q9 is pulled to a lower level which is then applied as tamper signal to power supply 41. This signals microprocessor 51 that a tamper condition has occurred to initiate an immediate callback sequence. When there is continuity in the loop defined by line L1, L2, which lines are attached to the pins of jumper J3 of tamper detect circuit 49, the signal is short-circuited and no signal appears at the base of Q9. Therefore Q9 would be turned off and Q10 would have no low voltage applied to the tamper line, even through Q10 would be in the "on" state as set by the initiating pulse.

The use of a short, pulsed tampering signal applied to lines L1, L2 has several advantages. First, pulsing the conductive loop L1, L2 only once every 16 seconds conserves battery power without significantly eroding the security of the system. The tamper pulse, although occurring at precise intervals, would effectively appear random to someone external to the RDU, since it would be difficult to detect the occurrence of the pulse in the very-low-impedance loop L1, L2. It would be virtually impossible for someone to break the tamper detecting loop, tamper with RDU 7 or its associated utility meter, and reconnect the tamper detecting loop without detection during the 16 second interval between pulses. An additional advantage is that by using a short, but higher energy pulse, it is easier to detect the continuity of tamper loop L1, L2 where the length of the loop is great (e.g. up to 1000 ft.). This makes the tamper detecting scheme of the present invention less likely to be affected by noise and provides a good signal-to-noise ratio for detecting the pulse applied to tamper detecting loop L1, L2 over much longer loop lengths than would be possible with a continuous direct current scheme, and without draining the onboard battery B of RDU 7 significantly.

In addition, RDU 7 may be programmed to immediately dial up host computer 1 if the supply voltage of battery B falls below a predetermined threshold indicating that battery B needs to be replaced.

Normally, whenever RDU 7 is activated and dials up host computer 1, the voltage of battery B is read and stored at host computer 1. This occurs whenever RDU 7 activates its regularly scheduled callback time, it has been polled by host computer 1 or a tamper indication has been detected, or a device has been connected to local diagnostics port 59 or an external port device request service. This occurs during the first few tenths of a second after RDU 7 is powered up and before it turns on modem 57 and seizes telephone line 6. The voltage measurement of battery B is made while RDU 7 is only drawing about 8 milliamps from battery B. Subsequently, after RDU 7 has seized telephone line 6 and activated modem 57, which increases the current drain to 15–20 milliamps, another battery measurement is taken and stored.

Once communication with host computer 1 has been established, these two measurements are transmitted to host computer 1, where the status of battery B can be determined using an appropriate algorithm based upon these two stored measurements. This algorithm may be selected by the operator of host computer 1 based upon the particular type of battery employed, its discharge characteristics, its age, ambient temperature variations, or the like. By performing the calculations at the host computer, this enables the algorithm to be modified to better approximate a desired battery life cycle voltage curve so that a battery is not replaced too soon or too late. The foregoing arrangement where battery voltage is measured at several load points is significantly more accurate than taking a single voltage reading under load as is the case with many prior art devices.

Alternatively, a circuit of the type shown in FIG. 9 may be connected to battery B. This circuit continuously monitors the battery voltage and compares it with a voltage reference. When the detected battery voltage falls before the voltage reference, this triggers a switch and generates a low battery alarm signal to turn on power supply 41 and initiate a callback sequence by RDU 7. While this embodiment does slightly increase the standby current drain on battery B, it does have the advantage of immediately alerting an operator at host computer 1 if the operating voltage of battery B should fall below a critical threshold at some time between its regularly scheduled callback times.

RDU 7 may also be caused to dial up host computer 1 by means of a diagnostic or test signal applied to local port 59 or by a dial up request signal applied by an auxiliary circuit connected to expansion bus ports 55. The application of a diagnostic/test signal to local port 59 enables the functioning of RDU 7 to be tested when it is first installed in a customer's site or if a problem is later suspected with its circuitry. As shown in FIG. 10, expansion bus ports 55 are arranged in the same housing as contain in RDU 7 in a daughter board/mother board configuration similar to as is used in personal computers. This enables auxiliary circuit boards to be added to RDU 7. These additional auxiliary circuit boards may contain additional memory, perform demand recording functions by sampling inputs from meter interface ports 53, perform load survey functions, accumulate pulses from a pulser type utility meter, a PTZ (pressure/temperature/density) corrector for a gas meter, contain a radio data link for communication with a transmitter/receiver located at a utility meter, or the like. Any of these auxiliary circuit cards may be designed to generate a wakeup signal to power supply 41 to turn on RDU 7 and initiate a dial up sequence back to host computer 1.

The expansion bus is designed to handle eight signals, including power and ground signals. One of the power signals may be supplied directly from battery B for expansion bus auxiliary devices which require a continuous source of power. Regulated five volt power is also supplied via power supply 41 for devices requiring a regulated five volt supply. The remaining bus lines are a serial data line, a serial clock line, an external service request XSR line, an external enable line for selecting one of four expansion bus ports to talk to. A line labelled "VXA" is a daisy chain analog input which can be connected to the analog-to-digital converter of microcontroller 31 to allow reading an analog voltage off the bus. This selection of signals serve to minimize the complexity of the attached function modules.

Typical operation of RDU 7 will now be described. A normal scheduled callback is initiated by the real time clock 45 reaching its designated actual callback time (the callback start time plus the pseudorandomly generated offset time interval) and causing power supply 41 to be turned on to power up the rest of the components of RDU 7. Once power has been applied to RDU 7 and microprocessor 51 has determined that real time clock 45 was indeed the reason that it was powered, microprocessor 51 records the battery voltage and then initiates a call to host computer 1.

Figure 6B:
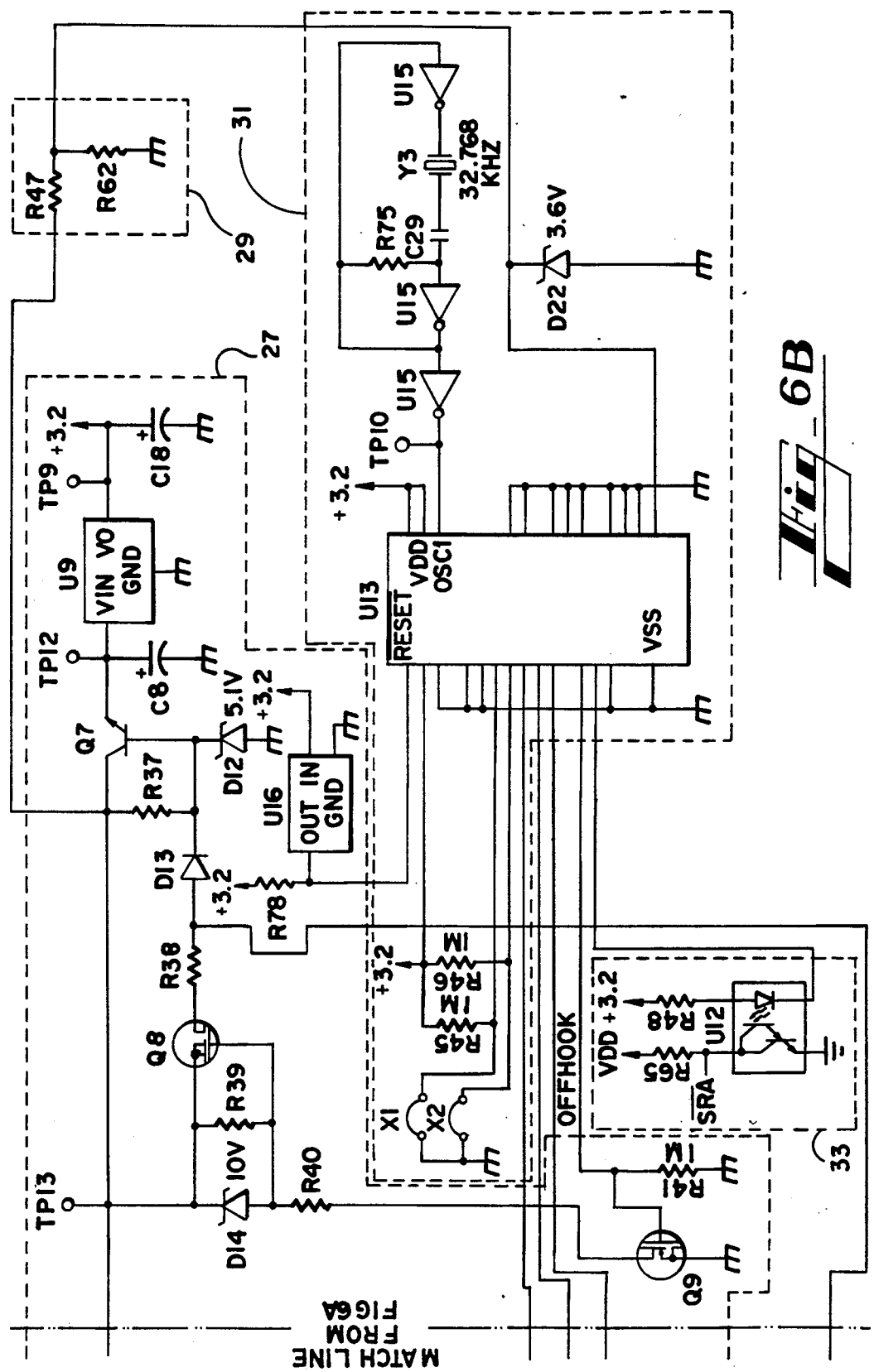
Figure 7A:
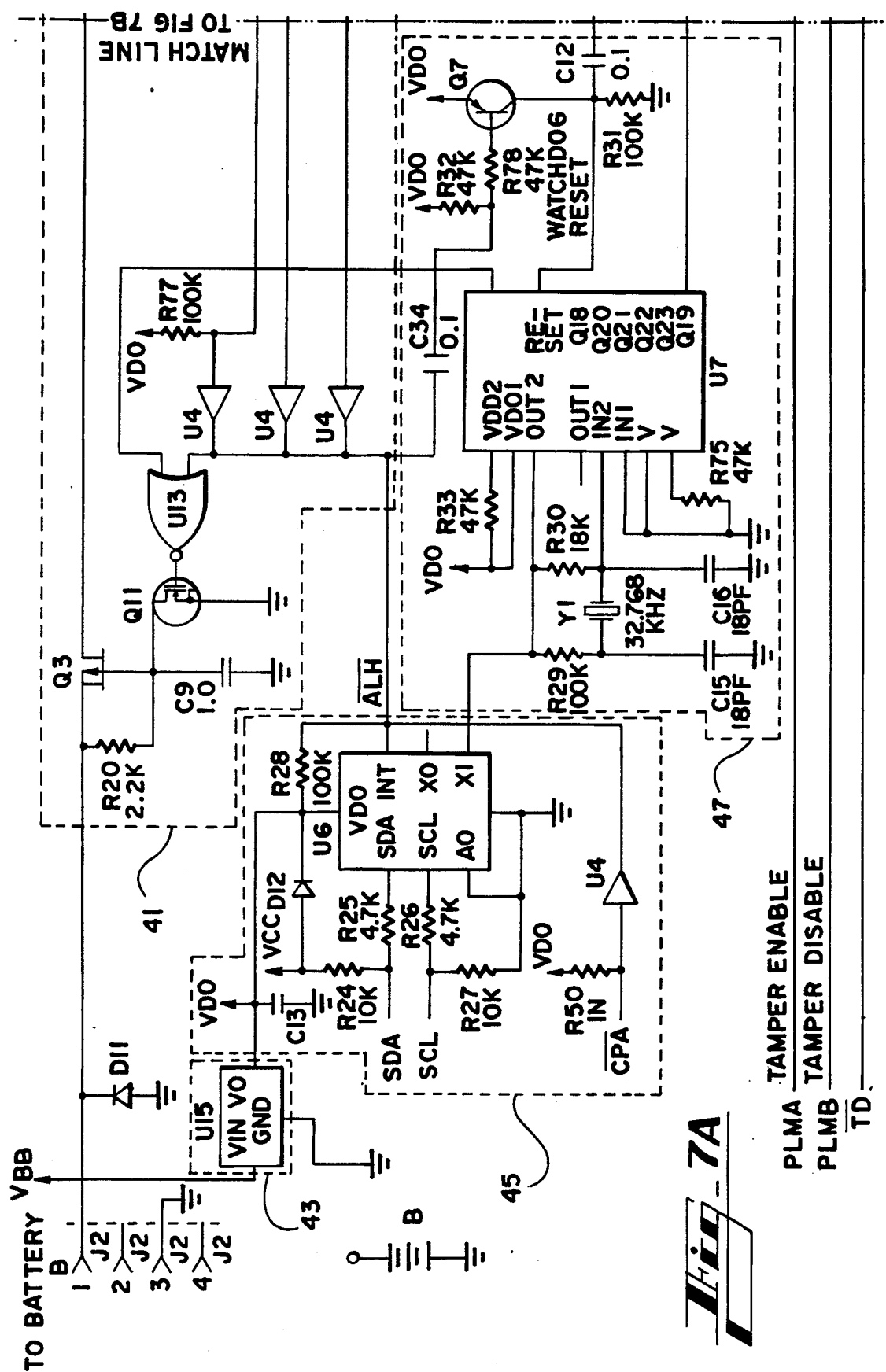
Figure 7B:
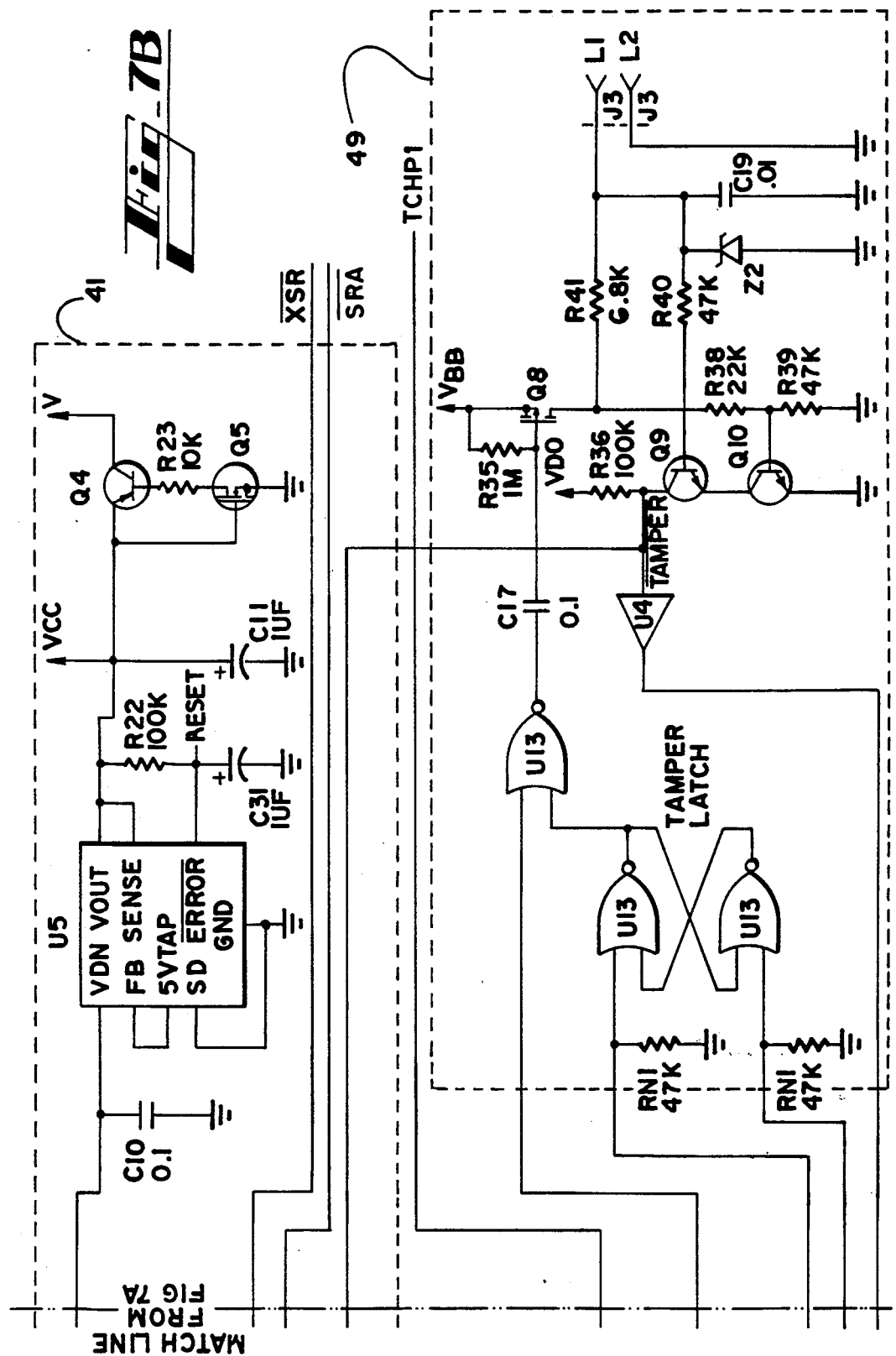
Figure 8C:
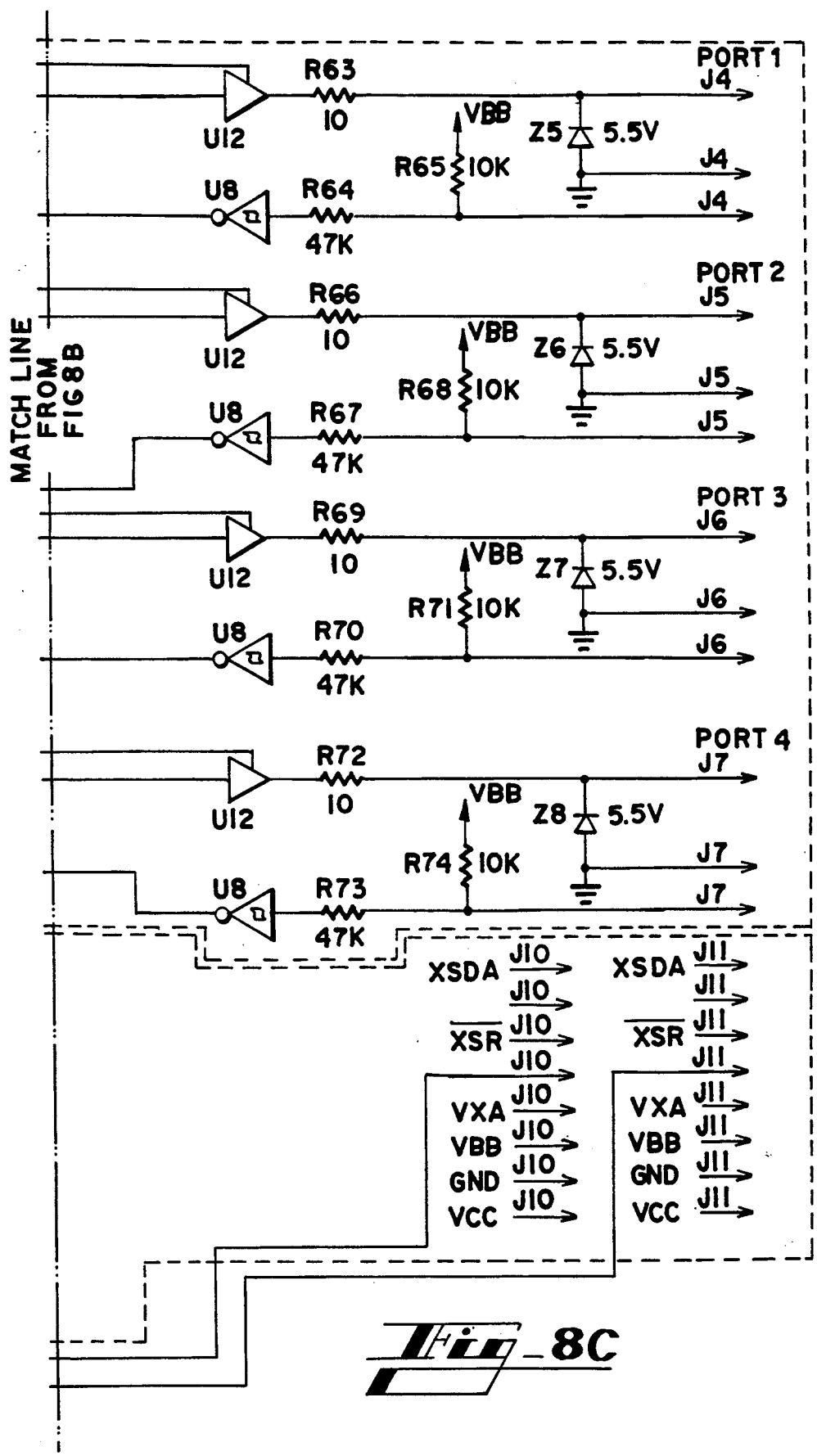

Microprocessor 51 retrieves the host computer's telephone number from internal memory, asserts the test line which is line A shown in FIGS. 3 and 6. This controls switch-hook circuitry 23 to test the voltage of telephone lines 6 by powering up front end power supply 27, front end microcontroller 31 and the remaining circuitry of the RDU front end shown in FIGS. 3 and 6A, 6B.

Once this is accomplished, microcontroller 31 signals its ready condition back to microprocessor 51 via optocoupler circuit 33. Microcontroller 31 then begins testing telephone line 6 to make sure that it is in an on-hook condition. Microprocessor 51 sends a command by toggling data bits through hook-switch circuitry 23 which are read through signal conditioning circuit 39 and into microcontroller 31 to tell microcontroller 31 what the expected on-hook line voltage should be. Microcontroller 31 then begins to test the voltage of telephone line 6 by doing an analog-to-digital conversion to determine whether the telephone line voltage is in fact what it should be for an on-hook condition. It will be recalled that during this testing procedure, power supply 27 and hook-switch circuitry 23 will draw a minimal amount (e.g. less than 3 milliamps) of current from telephone line 6 so as to not signal telephone exchange 5 that a device has gone off-hook on telephone line 6. If an off-hook condition is detected by line sense circuit 29, microcontroller 31 takes this information and outputs a continuous signal to microprocessor 51 via optocoupler 33. Microprocessor 51 then causes hook-switch 23 to be released and turns off power supply 41.

If telephone line 6 is determined to be on-hook, a momentary signal is sent by microcontroller 31 to microprocessor 51 via optocoupler 33. Microcontroller 51 also activates a second switch-hook 35 which now causes RDU 7 to pull more than 20 milliamps from telephone line 6 indicating to the telephone exchange 5 that a call is about to be made over line 6.

Exchange 5 then generates a dial tone and microprocessor 51 checks modem 57 to see if in fact a dial tone is present. If so, microprocessor 51 dials a single DTMF (Touch Tone TM) digit and tests line 6 again for a dial tone. If the dial tone signal is still present, microprocessor 51 proceeds to pulse dial telephone line 6 by toggling hook-switch circuit 23. On the other hand, if the dial tone signal is not present after the first pulse tone has been applied, indicating that the telephone exchange switch is DTMF tone compatible, microprocessor 51 will dial the rest of the DTMF digits indicative of the telephone number of host computer 1 through modem 57. Microprocessor 51 monitors through modem 57 the progress of the call and various timing parameters including waiting for an answer tone on the receive signal path.

Once an answer tone has been established from the modem associated with host computer 1 and verified it as being valid, modem 57 turns on its carrier (e.g. 1200 baud) which signals the host computer modem to switch its carrier to 1200 baud receive. Once that receive carrier is present on line 6 and is detected by modem 57 and communicated to microprocessor 51, the communication link is considered established between RDU 7 and host computer 1. Data communications between RDU 7 and host computer 1 consists of an initial single command sent by host computer 1 to RDU 7 requesting RDU 7 to identify itself (e.g. send its ID number or serial number) and to command RDU 7 to take meter readings from the registers associated with utility meters 11, 13, or 15. RDU 7 then takes the meter readings through meter interface ports 53. If any special meters or devices are connected through any of the expansion bus ports 55, RDU 7 will also read meters or those devices. The data is then sent back to host computer 1 as a serial data stream using commonly available data formats, such as ASCII or the like.

Host computer 1 also has the capability of asking RDU 7 to send data from each meter interface port and expansion bus port separately, rather than as one continuous data stream. This speeds up the communications process in situations where a utility does not wish to read all of the available ports, or for other specialized uses.

Once data transfer has been completed, host computer 1 then downloads a signal indicative of its current real time as generated by its onboard real time clock. This host computer clock time is downloaded to RDU 7 to reset the time being kept by real time clock 45. This resynchronizes the real time clock 45 of RDU 7 with the time being kept by host computer 1. Host computer 1 then downloads the next callback start time. RDU 7 generates the offset time interval in a pseudorandom manner, adds it to the callback start time and calculates an actual callback time from the sum. This actual callback time is transmitted back to host computer 1 which determines whether it is an acceptable time through comparison with a table of such times stored in its computer memory. If the proposed actual callback time is acceptable, the host computer 1 indicates this to RDU 7 which hangs up the telephone line and goes into its idle state. If the proposed actual callback time is not acceptable, the host computer will ask RDU 7 to generate a new offset time interval and calculate a new actual callback time until an acceptable time is indicated by the RDU 7.

While the present invention has been described in considerable detail, it will be understood that various additions and modifications will occur to those skilled in the art, while still falling within the scope of the invention as defined in the appended claims.

We claim:

1. Apparatus for transferring data over a telephone network comprising:
   a remote data unit; and
   a host computer, said remote data unit and said host computer being interconnected over a telephone network;
   said remote data unit including:
   a) timing means for generating a time signal in a pseudorandom manner;
   b) real time clock means for generating an indication of real time;
   c) means for comparing said real time with said pseudorandomly generated time signal;
   d) means responsive to said comparison between said real time and said pseudorandomly generated time signal for accessing said telephone network when said real time bears a predetermined relationship to said pseudorandomly generated time signal; and
   e) means for transferring data from said remote data unit to said host computer, said transferring means further transferring a subsequently generated pseudorandom time signal generated by said timing means to said host computer;
   said host computer including means for receiving and comparing said subsequently generated pseudorandom time signal with a table of allowable times, said host computer further including means for sending an indication back to said remote data unit of whether the time indicated by said subsequently generated pseudorandom time signal is acceptable as shown by said comparison with said table of allowable times and, if so, said time is accepted as the next time of callback for said remote data unit and, if not, said host computer sending an indication to said remote data unit to cause said timing means to generate another pseudorandomly generated time signal, said host computer storing an indication of the acceptable time of callback for said remote data unit in said table of allowable times.

2. The apparatus of claim 1 wherein said host computer further includes means for sending an indication to said remote data unit of a range of allowable times, said timing means being responsive to said range of allowable times to constrain the generation of said pseudorandomly generated time signal to said allowable range of times.

3. The apparatus of claim 1 wherein said remote data unit includes means for monitoring the voltage of a battery powering said remote data unit and for transferring an indication of said battery voltage to said host computer when said remote data unit and host computer are in communication with each other.

4. The apparatus of claim 1 wherein said remote data unit includes means for detecting an alarm condition and, responsive thereto, for immediately accessing said telephone line and transferring a signal indicative of said alarm condition to said host computer.

5. The apparatus of claim 4 wherein said alarm condition is an indication of voltage of a battery powering said remote data unit dropping below a predetermined limit.

6. The apparatus of claim 4 wherein said alarm condition is an indication of tampering.

7. The apparatus of claim 6 wherein said remote data unit includes a remote conductive loop and means for periodically applying a current to said loop and for detecting the continuity of said loop and, responsive to an indication of a lack of continuity, generating said alarm condition.

8. The apparatus of claim 1 wherein said remote data unit includes means for detecting whether said telephone line is off-hook.

9. The apparatus of claim 8 wherein said off-hook detecting means includes means for measuring an initial value indicative of an off-hook electrical characteristic of said telephone line, means for measuring an average value of said off-hook electrical characteristic of said telephone line at a predetermined time, means for comparing said initial value and said average value and for disconnecting said remote data unit from said telephone line when said comparison differs by a predetermined amount.

10. The apparatus of claim 8 wherein said off-hook detecting means includes means for measuring an initial value indicative of an off-hook electrical characteristic of said telephone line, means for measuring an average value of said offhook electrical characteristic of said telephone line at a predetermined time, means for comparing said initial value and said average value and for preventing access to said telephone line by said remote data unit if said comparison differs by a predetermined amount.

11. The apparatus of claim 8 wherein said off-hook detecting means includes means for storing said initial value.

12. The apparatus of any one of claims 9, 10, or 11 wherein said electrical characteristic is the voltage of said telephone line.

13. The apparatus of claim 1 wherein said remote data unit includes an expansion bus arranged to receive auxiliary circuit cards for direct communication with said remote data unit.

14. The apparatus of claim 1 wherein said remote data unit further includes means for detecting a predetermined number of ringing signals applied to said telephone network within a predetermined time period and, responsive thereto, for accessing said telephone network and establishing communication between said host computer and said remote data unit.

15. The apparatus of claim 1 in combination with a gas, electric or water meter.

16. The apparatus of claim 15 wherein said meter includes an absolute encoder in communication with said remote data unit.

17. A method for transferring data between a remote data unit and a host computer over a telephone network comprising the steps of:

(a) generating at said remote data unit a time signal in a pseudorandom manner;

(b) generating at said remote data unit an indication of real time;

(c) comparing said real time with said pseudorandomly generated time signal;

(d) accessing said telephone network when said real time equals said pseudorandomly generated time signal;

(e) transferring data from said remote data unit to said host computer;

(f) transferring a subsequently generated pseudorandom time signal generated by said timing means to said host computer;

(g) receiving and comparing at said host computer said subsequently generated pseudorandom time signal with a table of allowable times and sending an indication back to said remote data unit of whether the time indicated by said subsequently generated pseudorandom time signal is acceptable as shown by said comparison with said table of allowable times and, if so, accepting said time as the next time of callback for said remote data unit and, if not, said host computer sending an indication to said remote data unit to cause another pseudorandom time signal to be generated; and (h) storing at said host computer an indication of the accepted time of callback for said remote data unit in said table of allowable times.

18. The method of claim 17 wherein said host computer further sends an indication to said remote data unit of a range of allowable times, said remote data unit being responsive to said range of allowable times to constrain the generation of said pseudorandomly generated time signal to said allowable range of times.

19. The method of claim 17 wherein said remote data unit monitors the voltage of a battery powering said remote data unit and transfers an indication of said battery voltage to said host computer when said remote data unit and host computer are in communication with each other.

20. The method of claim 17 wherein said remote data unit further performs the steps of detecting an alarm condition and, responsive thereto, immediately accessing said telephone line and transferring a signal indicative of said alarm condition to said host computer.

21. The method of claim 20 wherein said alarm condition is an indication of voltage of a battery powering said remote data unit dropping below a predetermined limit.

22. The method of claim 20 wherein said alarm condition is an indication of tampering.

23. The method of claim 22 further including the steps of periodically applying an electrical current to a remote conductive loop and detecting the continuity of said loop and, responsive to an indication of a lack of continuity, generating said alarm condition.

24. The method of claim 17 wherein said remote data unit further performs the step of detecting whether said telephone line is off-hook.

25. The method of claim 24 wherein said step of detecting whether said telephone line is off-hook includes the steps of measuring an initial value indicative of an off-hook electrical characteristic of said telephone line, measuring an average value of said off-hook electrical characteristic at a predetermined time, comparing said initial value with said average value and disconnecting said remote data unit from said telephone line when said comparison differs by a predetermined amount.

26. The method of claim 24 wherein said step of detecting whether said telephone line is off-hook includes the steps of measuring an initial value indicative of an off-hook electrical characteristic of said telephone line, measuring an average value of said off-hook electrical characteristic at a predetermined time, comparing said initial value with said average value and preventing access to said telephone line by said remote data unit when said comparison differs by a predetermined amount.

27. The method of claim 24 further including the step of storing said initial value.

28. The method of any one of claims 25, 26, or 27 wherein said electrical characteristic is the voltage of the telephone line.

29. The method of claim 17 wherein said remote data unit further performs the steps of:
  (a) detecting a predetermined number of ringing signals applied to said telephone network within a predetermined time period, and responsive thereto;
  (b) accessing said telephone network and establishing communications between said host computer and said remote data unit.

* * * * *